US012598063B2

(12) United States Patent
Hayes

(10) Patent No.: US 12,598,063 B2
(45) Date of Patent: Apr. 7, 2026

(54) CLOCK SECURITY FOR STATISTICAL OBJECT GENERATION

(71) Applicant: Invisinet Technologies LLC, Houston, TX (US)

(72) Inventor: John W. Hayes, Clearwater Beach, FL (US)

(73) Assignee: Invisinet Technologies LLC, Houston, TX (US)

( * ) Notice: Subject to any disclaimer, the term of this patent is extended or adjusted under 35 U.S.C. 154(b) by 167 days.

(21) Appl. No.: 18/505,720

(22) Filed: Nov. 9, 2023

(65) Prior Publication Data

US 2025/0158812 A1 May 15, 2025

(51) Int. Cl.
*H04L 9/08* (2006.01)
*H04L 9/06* (2006.01)

(52) U.S. Cl.
CPC .......... H04L 9/0872 (2013.01); H04L 9/0643 (2013.01)

(58) Field of Classification Search
CPC ........ H04L 9/0872; H04L 9/0643; H04L 9/12
See application file for complete search history.

(56) References Cited

U.S. PATENT DOCUMENTS

| | | | |
|---|---|---|---|
| 8,572,697 | B2 | 10/2013 | Hayes et al. |
| 9,973,499 | B2 | 5/2018 | Hayes et al. |
| 2017/0214690 | A1* | 7/2017 | Hayes ...................... H04L 9/12 |
| 2020/0213092 | A1* | 7/2020 | Shim .................... H04L 9/0866 |

OTHER PUBLICATIONS

"Clam Vielhauer'.*, Ralf Steinrnetz', Astrid Mayerhofer" "Biometric Hash based on Statistical Features of Online Signatures" IEEE (Year: 2002).*

* cited by examiner

*Primary Examiner* — Mohammed Waliullah

(57) ABSTRACT

A method includes operating an activation agent to access a clock value and at least one original object. The activation agent communicates said clock value and said at least one original object to an object activation service. The object activation service is operated to generate keying information and expiration criteria for the at least one original object. The keying information includes a clock offset and an async reset value. The object activation service communicates the keying information and the expiration criteria to the activation agent.

11 Claims, 35 Drawing Sheets

A statistical object is the output of a function.
The function points to an output string of values based on an input Function points to a value depending on input Input Original Object $f(x)$ $x_1, x_2, x_3 ... x_n$ Additional Inputs, Clock or Counter A statistical object is the output of a function.
The function points to an output string of values
based on an input Function points to a
value depending on
input Input Original
Object $f(x)$ $X_1, X_2, X_3 \ldots X_n$ Additional Inputs,
Clock or Counter A graph showing the approximate probability of at least two people sharing a birthday amongst a certain number of people

FIG. 6

Certificates confirm identity, and are digitally signed

No. 1   Sally

No. 2   Ben

No. 3   Greg

FIG. 7

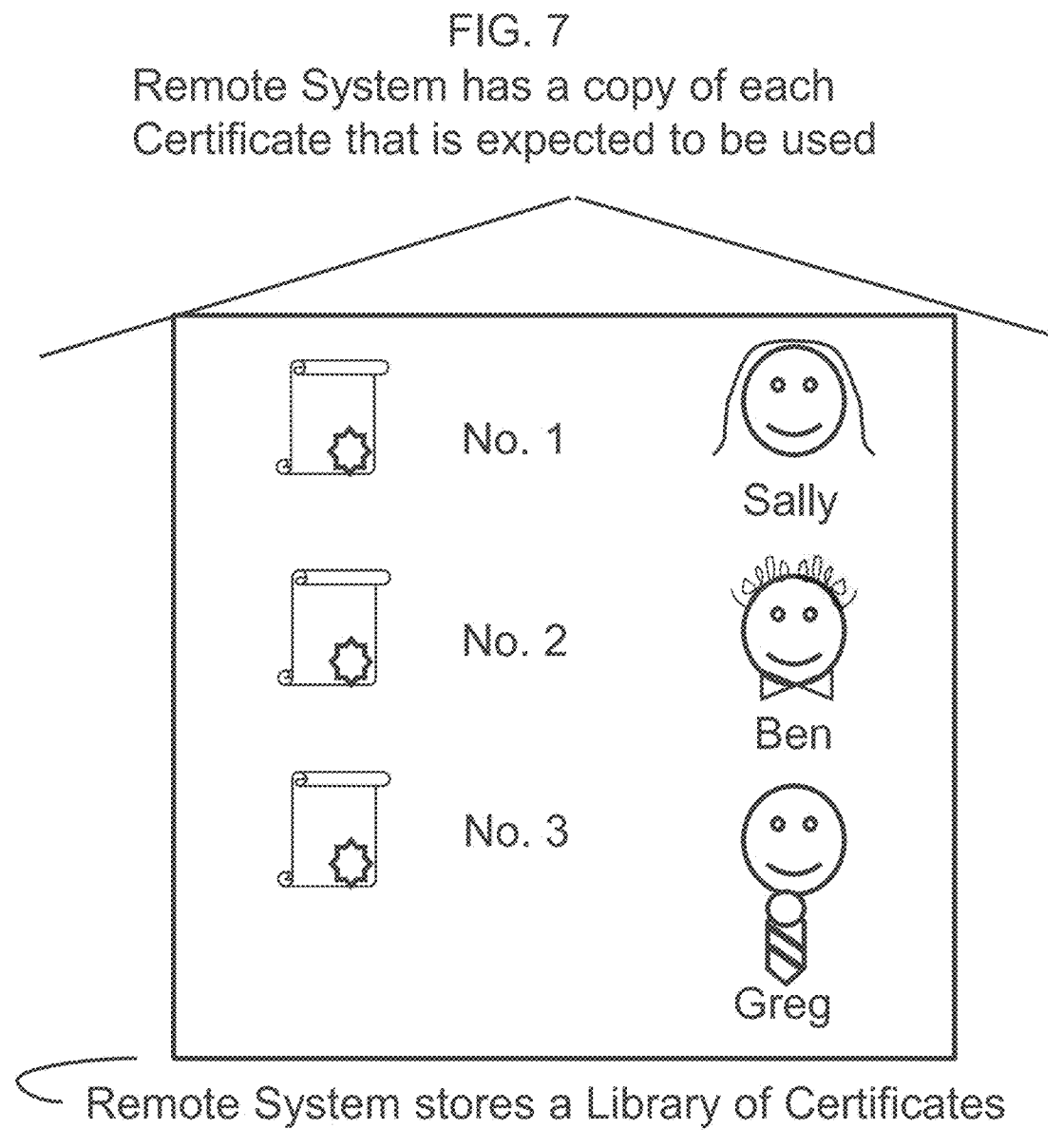

Remote System has a copy of each
Certificate that is expected to be used

No. 1     Sally
No. 2     Ben
No. 3     Greg

Remote System stores a Library of Certificates

Problem: A Certificate is too big to send the Remote System in its original form The Solution:
Create a representation of each Certificate, called a Cryptographic Hash, which is only 32 bits long, and send to the Remote System Certificate
8,192 bits

CONVERT TO

Cryptographic
Hash
ONLY
32 bits

THEN SEND TO

Remote
System

The Solution, in Greater Detail:

Time Value from a Clock

Certificate is an Original Object
12S

The Cryptographic Hash is a Statistical Object
14S

Which is sent to Remote System

CH Values:

22443

32415

32415

} These values are statistical objects 14S

CONVERT TO

Example:

Sally

Ben

Greg

Certificates 12S

Ben needs to communicate with the Remote System

Remote System receives Ben's communication

Statistical Object Matcher

Accumulated Statistical
Object Selector

Original Object Identifier

14AP

From ASOS 20

Latest entry, 14AP does not unambiguously identify single original object 12S, so

NO RESPONSE TO BEN

26
ORIGINAL OBJECT IDENTIFIER

Ben's first communication fails.

Ben does not receive response to his first communication to the Remote System, so he tries again:

FIG. 18
Second Try

Now that time has passed, the clock value used to generate statistical objects has changed.

The new statistical objects are now:

| | | | NEW SO 14S |
|---|---|---|---|
| No. 1 | | Sally | 84256 |
| No. 2 | | Ben | 84256 |
| No. 3 | | Greg | 10845 |

Ben sends a second communication:

A match is found:

Greg & Sally are discarded!

FIG. 22

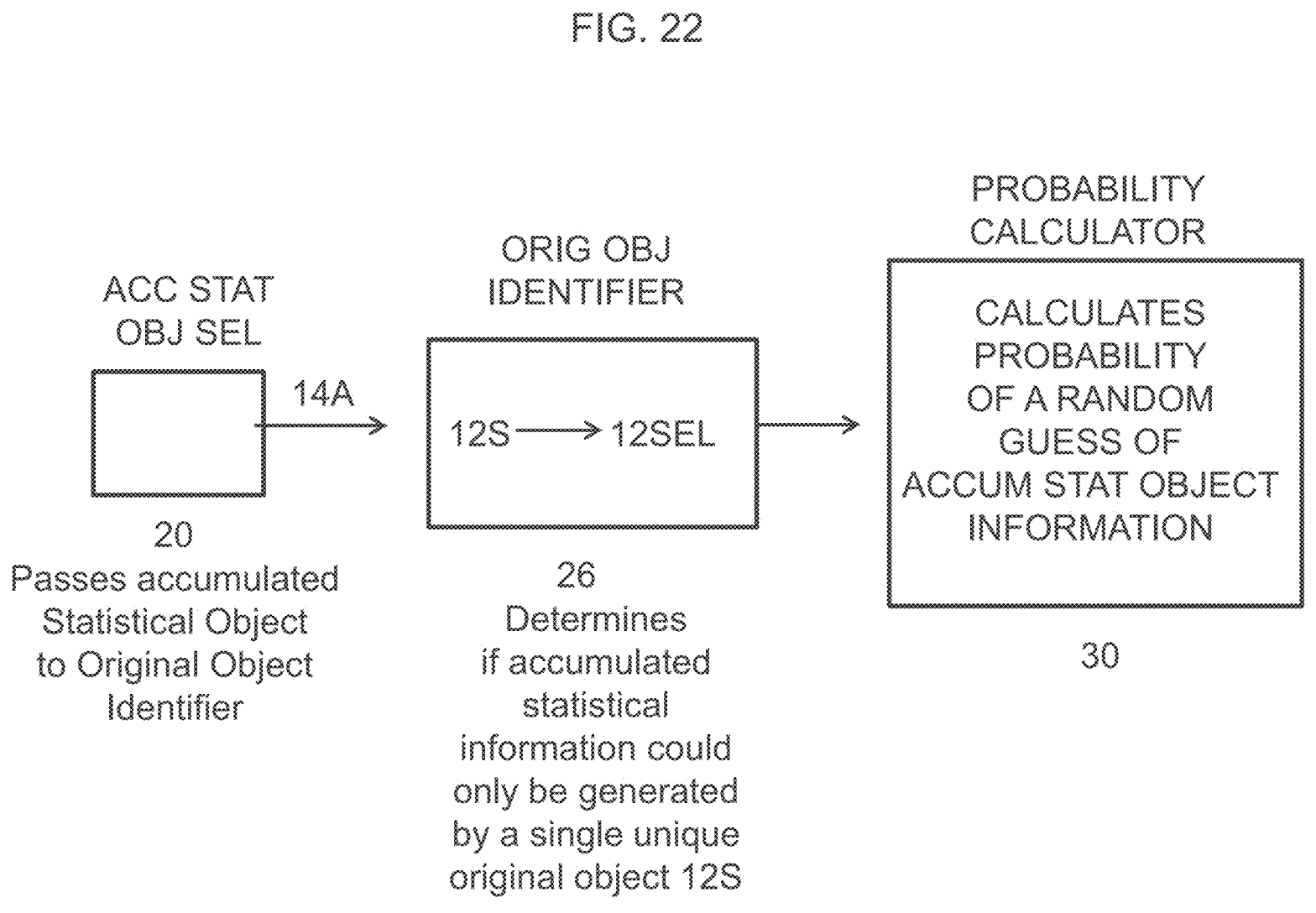

PROBABILITY CALCULATOR

CALCULATES PROBABILITY OF A RANDOM GUESS OF ACCUM STAT OBJECT INFORMATION

30

ORIG OBJ IDENTIFIER

12S ⟶ 12SEL

26

Determines if accumulated statistical information could only be generated by a single unique original object 12S

14A

ACC STAT OBJ SEL

20

Passes accumulated Statistical Object to Original Object Identifier

FIG. 23

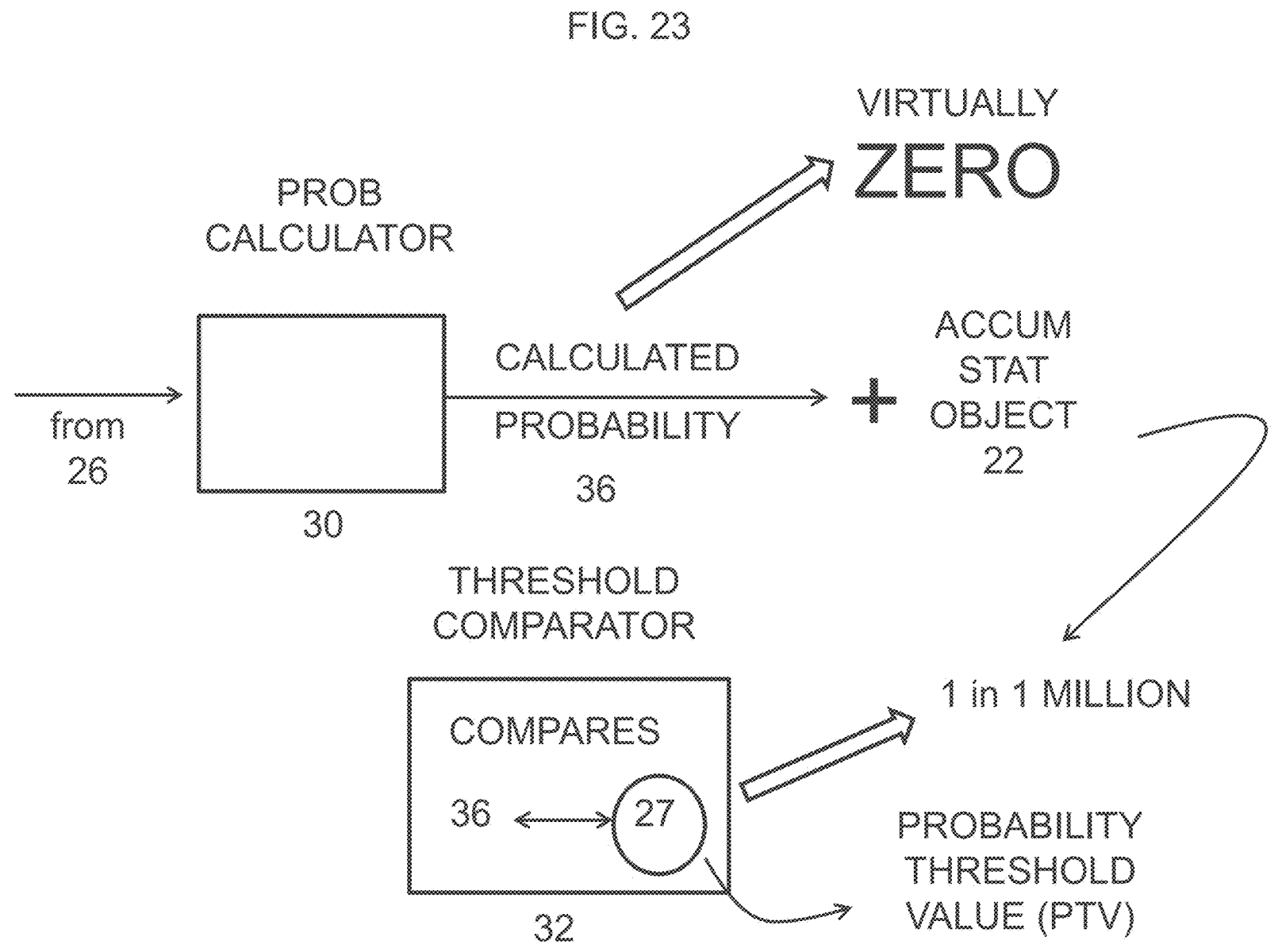

VIRTUALLY ZERO

ACCUM
STAT
OBJECT
22

1 in 1 MILLION

PROBABILITY
THRESHOLD
VALUE (PTV)

CALCULATED
PROBABILITY
36

THRESHOLD
COMPARATOR

PROB
CALCULATOR

COMPARES

27

36 → 36

32

30 from
26

CLOCK SECURITY FOR STATISTICAL OBJECT GENERATION

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of computer security. More particularly, the present disclosure relates to methods of securely using synchronization information used to generate a series of statistical objects.

It is known that synchronized clocks can be used as a coordination mechanism coordinating the operation of distributed entities.

Statistical objects are used where conventional secured communications of an original object cannot be used due to protocol constraints or communications bandwidth limitations. Using a statistical object instead of an original object achieves much greater bandwidth efficiency due to the use of a deterministic statistical representation of the original object.

In this disclosure, the term "statistical object" is a string of values mapped by a random or "hash" function. The output of this function is a string of values which stands for or represents the input to the function. In FIG. 1, the output string of values is shown as x1, x2, x3 . . . xn. In this example, the input of the function is an original object, while the output is a statistical object.

If the output string is shorter than the input string, a "collision" occurs. A collision results when two or more different inputs produce the same output, which is generally considered detrimental.

To mitigate the effects of collisions, additional inputs can be added to the function. These additional inputs may vary over time, enabling different streams of statistical objects eventually to diverge from their colliding tendencies. As an example, a clock may be employed to add a time value as an input. As another example a counter may serve as an input. Multiple additional inputs may be used together in the generation of the statistical object. This is illustrated in FIG. 1.

In this disclosure, the terms "function," "random function" and "hash function" are intended to include any procedure or mathematical method that converts a large amount of data into a smaller amount of data. In an example embodiment, the output may be a single integer or value which serves as an index to an array or database. The output values of a hash function may be referred to as hash values, hash codes, hash sums, checksums, or hashes. The inputs to a hash function may be referred to as keys.

FIG. 2 illustrates a simple example of the operation of a hash function. A set of four inputs or keys are shown as the names Joe, Moe, Sam, and Charlie. The hash function F(x) associates a hash or output with each name. The input of Joe causes the hash function to point to output "03". The input of Moe causes the hash function to point to the output of "01". The input of Sam causes the hash function to point to the output of "06". The input of Charlie causes the hash function to point to the output of "03". Because the Joe and Charlie inputs both return a hash of "03", this pair of hashes is said to cause a collision.

As noted above, this collision may be avoided by adding a clock or a counter as an additional input to the hash function. So, in an example embodiment, if the input of Joe is provided to the hash function at a clock time of 1:00 p.m. (13:00), and the input of Charlie is provided to the hash function at a clock time of 2:00 p.m. (14:00), the different inputs would lessen the probability that this collision would occur.

One possible advantage of using statistical objects is that information may be "concentrated" in a relatively fewer number of transmitted bits, which increases the efficiency of communication across a network.

A consequence of using a deterministic statistical representation is that the representation is not guaranteed to identify uniquely to the source original object. The deterministic statistical representation, which is the statistical object, may be generally considered to be the output of a hash or similar function applied to the original object along with one or more varying deterministic inputs such as a clock or counter. These varying deterministic inputs are important so that the cumulative stream of output statistical objects generated from a single original object is generally unique across a large number generated statistical objects. Unambiguously identifying a statistical object to a unique original object is essentially an exercise in mitigating the effects of the "birthday problem." The birthday problem is the probability that output of the hash of different original objects and their respective deterministic inputs produce identical statistical objects. The generation of a single statistical object by two or more original objects, as explained previously, causes a collision.

FIG. 3 shows a graph that illustrates the birthday problem. The number of individuals in any given group is shown on the x-axis. The y-axis shows an approximate probability, on a scale from zero to one, that two individuals in the group share the same birthday. As an example, in a group of twenty-three people, the probability that two persons in this group will have the same birthday is about fifty percent.

The birthday problem may be understood as an example of the hash function depicted in FIG. 2. In the birthday problem, the keys or inputs may be the names of the individuals in the group. The hash function maps these inputs to one of the hashes or outputs, which represent the days of the year. If two persons in the group share the same birthday, the hash function points to the same day for two different individuals, and a collision occurs.

Given a uniform distribution, the probability of a collision increases with the number of statistical objects in use. A mechanism to unambiguously identify statistical objects back to their original objects would constitute a major technological advance and would satisfy long felt needs the cyber security industry.

Statistical Object Identification is described in U.S. Pat. No. 8,572,697, entitled Method for Statistical Object Identification. The '697 patent describes using a clock when generating a statistical object, but does not describe any protections for the clock information.

Statistical Object Identification is also described in U.S. Pat. No. 9,973,499 entitled Method for Statistical Object Identification. The '499 patent describes using an asynchronous reset value, but does not describe any protections for the clock information.

SUMMARY

A method according to one aspect of the present disclosure includes operating an activation agent to access a clock value and at least one original object. The activation agent communicates the clock value and the at least one original object to an object activation service. The object activation service is operated to generate keying information and at least one expiration criterion for the at least one original object. The keying information includes a clock offset and an async reset value. The object activation service communicates the keying information and the at least one expiration criterion to the activation agent.

In some embodiments, the keying information is unique for each of a plurality of original objects.

In some embodiments, the keying information includes a session key.

Some embodiments further comprise providing a statistical object identification (SOI) insertion policy service and a network resource. The object activation agent communicates the keying information and the at least one expiration criterion for each of a plurality of original objects to the SOI insertion policy service. A network client communicates a message to the network resource. The message is communicated via the SOI insertion policy service. The SOI insertion policy service is used to select one of the plurality of original objects, and generates a statistical object using the keying information associated with the selected one of the plurality of original objects. The SOI insertion policy service is used to insert the statistical object into the message. The message is forwarded to the network resource.

Some embodiments further comprise using the object activation service to communicate the keying information and the at least one expiration criterion for each of a plurality of original objects to the statistical object identification (SOI) policy service. A SOI policy service is used to generate at least one statistical object using the keying information for each of a plurality of original objects.

Some embodiments further comprise ceasing operating the SOI policy service from generating the statistical objects after the at least one expiration criterion has been met.

In some embodiments, the statistical objects are uniquely generated at a frequency greater than a frequency of the clock.

Some embodiments further comprise operating the object activation agent to communicate the keying information, and the at least one expiration criterion for each of a plurality of original objects to a statistical object identification (SOI) resolution service. The SOI resolution service is operated to generate a plurality of statistical objects using the keying information for each of the plurality of original objects.

Some embodiments further comprise ceasing operating the SOI resolution service from generating statistical objects after the at least one expiration criterion has been met.

A method according to another aspect of the present disclosure includes operating a first statistical object identification (SOI) resolution service to receive at a plurality of original objects, keying information, an expiration criterion, and policy information from a second statistical object identification (SOI) resolution service. The keying information includes a clock offset and an async reset value. The second SOI resolution service is operated to generate a plurality of statistical objects. Each of the plurality of statistical objects corresponds to one of the plurality of original objects. The generating statistical object continues until the expiration criterion is satisfied.

In some embodiments, the keying information includes a session key.

Other aspects and possible advantages will be apparent from the description and claims that follow.

BRIEF DESCRIPTION OF THE DRAWINGS

FIG. 6 illustrates certificates that are used to authenticate a communication.

FIG. 7 shows certificates stored in a remote system.

FIG. 18 supplies a schematic view of Ben's second attempt to communicate with the remote system.

FIG. 22 furnishes a view of a probability calculator, which computes the probability of a successful guess of accumulated statistical object information.

FIG. 23 reveals the function of a threshold comparator, which compares the calculated probability to a probability threshold value.

FIG. 30 is an illustration which shows a network client connected to a network.

FIG. 32 is an illustration which shows an embodiment of the present disclosure, an SOI insertion device.

DETAILED DESCRIPTION

Figure 1:
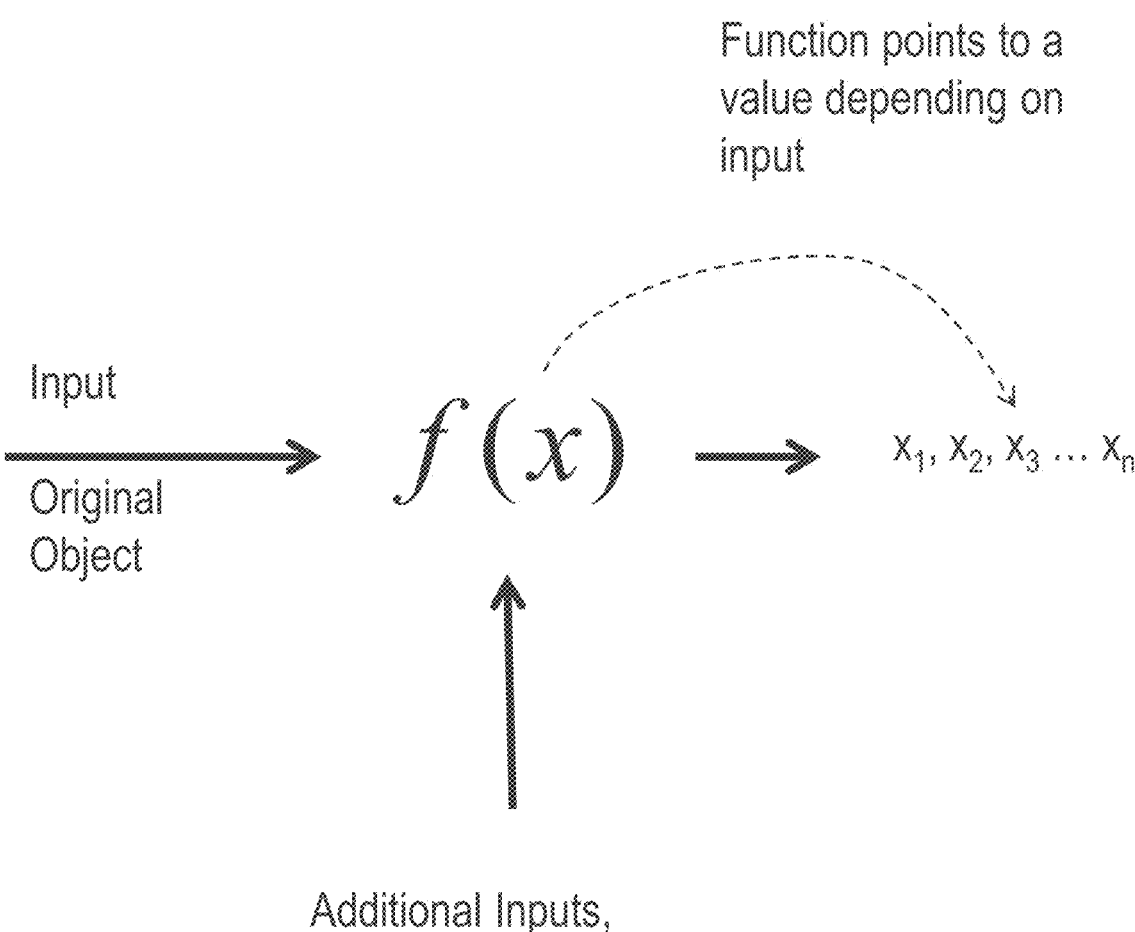
FIG. 1 illustrates the general operation of a hash function.
Figure 2:
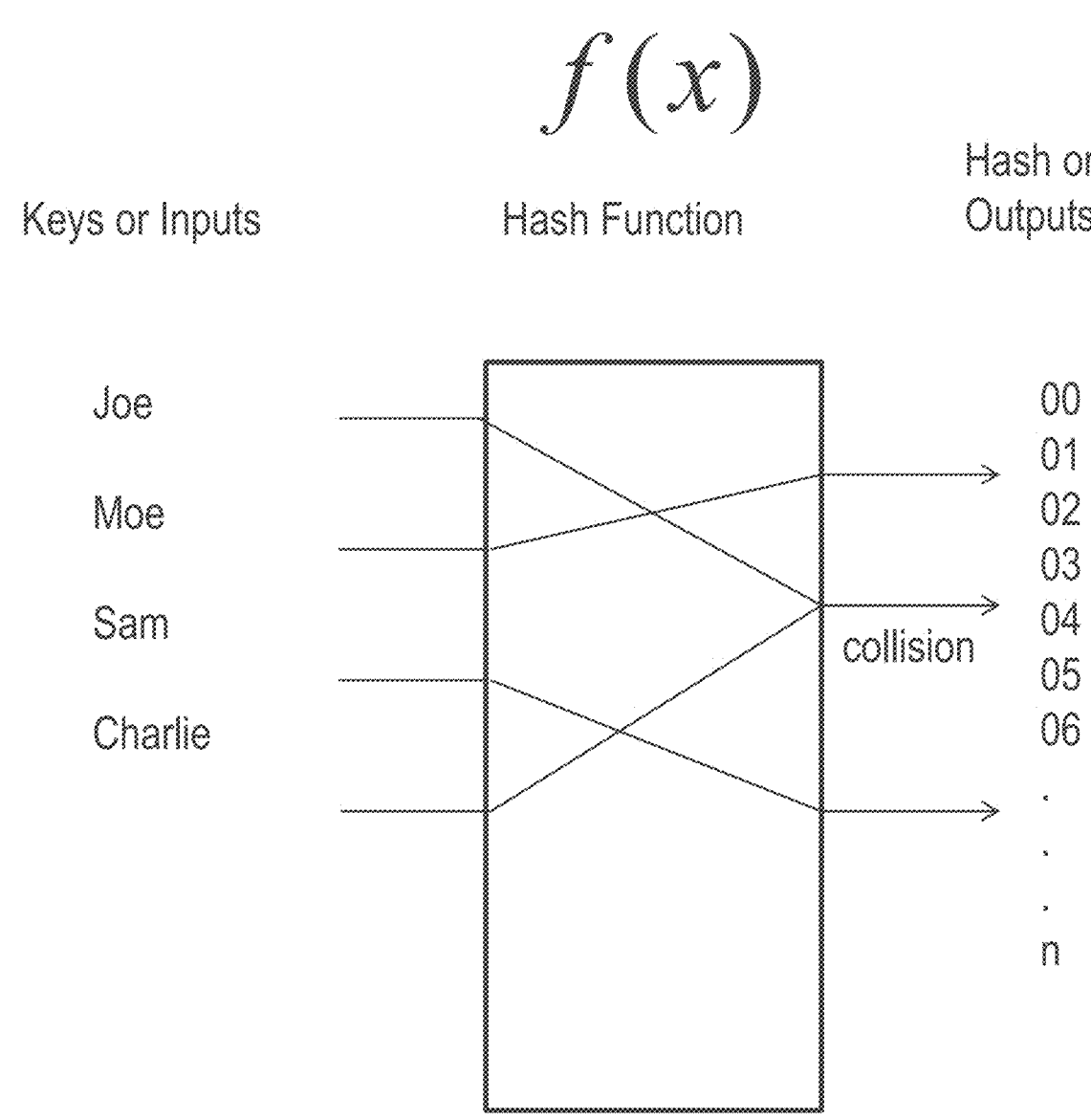
FIG. 2 shows how the hash function illustrated in FIG. 1 maps a set of inputs to a set of outputs.
Figure 3:
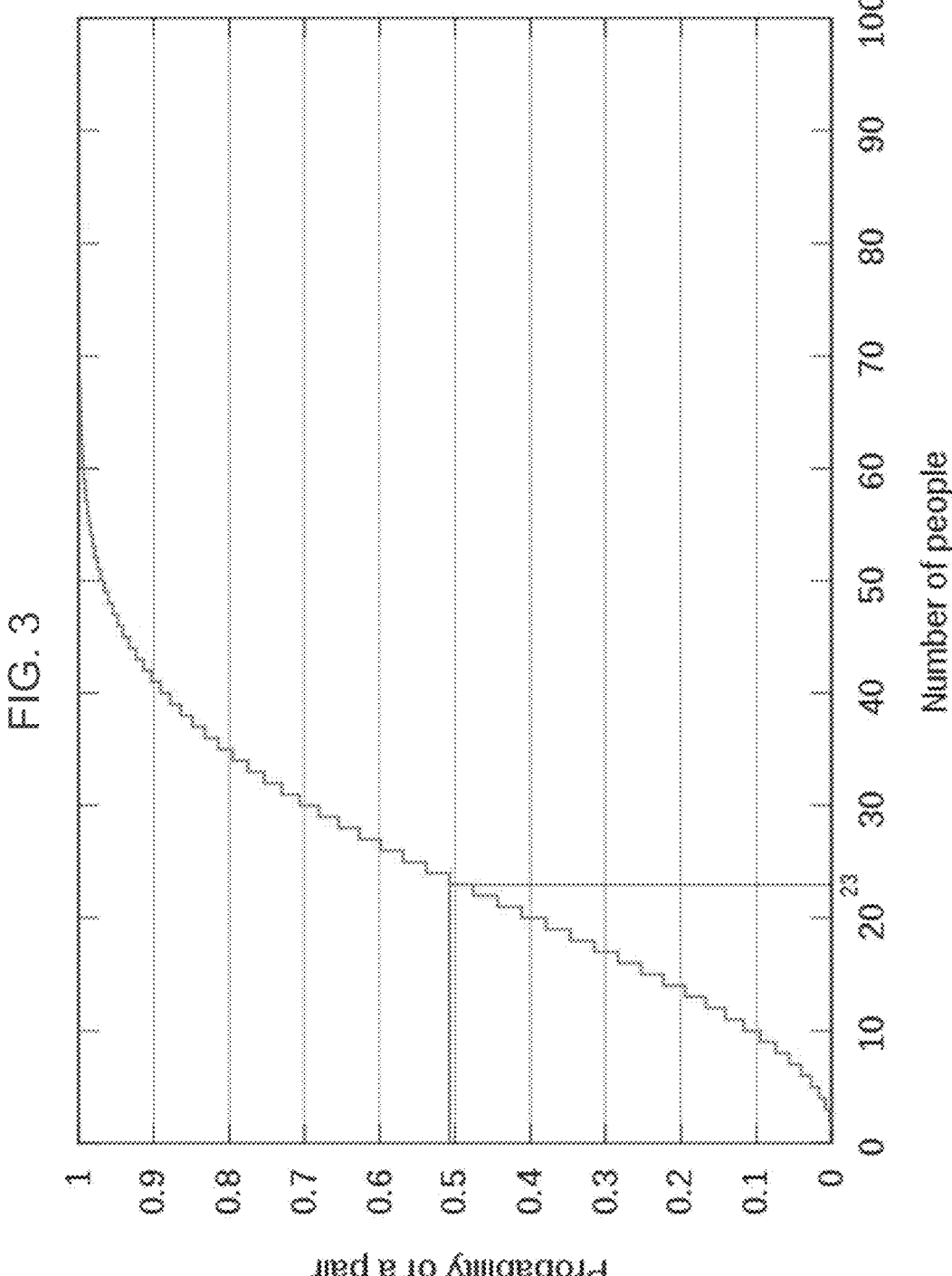
FIG. 3 is a graph that illustrates the birthday problem.

The present disclosure provides a method for protecting synchronization information used in the generation of statistical objects. The development of such a system would constitute a major technological advance and would satisfy long felt needs and aspirations in the network security industry.

I. Principles of Statistical Objects

A statistical object is a deterministic statistical representation of an original object. A statistical object as that term is used herein may be generally considered to be the output of a "hash" or similar function coupled with additional inputs of clocks, counters, and other various deterministic inputs. Unambiguously identifying a statistical object as representing a unique original object is essentially an exercise in mitigating the effects of the "birthday problem" explained in the Background section herein. The birthday problem is the probability that the output of the hash function for different original objects and their associated deterministic inputs is in the form of identical statistical objects. As explained in the Background section herein, generation of a single statistical object by two or more original objects causes a collision. The probability of a collision increases with the number of statistical objects in use. Statistical objects are designed to be used as components of security devices. As a component to security devices, in addition to uniquely identifying a statistical object with the correct original object, the overall probability of guessing any valid statistical object should also be considered. Guessing a valid statistical object by an attacker may enable unauthorized access to a computer system or network, and is the result intended to be avoided. The amount of space available to carry a statistical object will vary with the communications mechanism, but the size of an individual statistical object is expected to remain small, generally less than the number of bits required to uniquely identify an original object when large numbers of objects are in use. This requires the aggregation of two or more related statistical objects into a larger aggregate statistical object. Aggregating multiple related statistical objects into a single aggregate statistical object requires that all possible original object resolution matches are tracked and maintained. Multiple statistical objects from the same original object can be associated together by using information associated with the communication and reception of the statistical objects. This information, called communications characteristics, can include networking information, such as the source address or network session information including source and destination addresses and source and destination port numbers. Communications characteristics can also include physical information such as the physical port upon which the statistical object was received or the logical channel upon which the statistical object was received.

To unambiguously identify the original object from which a statistical object or a stream of statistical objects was generated, the device performing the identification can maintain a table of all valid statistical objects. The table may contain collisions where multiple original objects generate the same statistical object. The table may contain clock dentations (timestamps) indicating when each entry of data is added to the table. When a statistical object is received, it is first looked up in the table of all statistical objects to determine if the received statistical object is valid. If the received statistical object is not found (i.e., is not matched to any entry) in the table, then no further processing occurs with respect to identifying the original object on that particular statistical object reception. When a statistical object is received and is not matched in the table, it is considered as an attack on the device or system, and a counter associated with the current time period is incremented. Attack counters are maintained for each time period, corresponding to the statistical object detection timestamps. When a statistical object is received and is matched in the table of all valid statistical objects, the communications characteristics associated with reception of the matched statistical object and the list of all potential original objects are recorded. If the list of potential original objects has exactly a single entry, then the original object is identified, and the process moves on to calculating statistical probability. It will be appreciated that "table" as that term is used herein may be a logical element within a computer or computer system in which logical entries are separately and individually addressable.

When a statistical object is received and is not unambiguously identified (i.e., matched to a single original object in the table) and therefore represents a partially identified statistical object, the partially identified statistical object and the list of potential original objects associated with such statistical object are recorded along with the communications characteristics associated with the reception of the statistical object. When another statistical object with related communications characteristics is received, the list of potential original objects is pruned of original objects that cannot generate the complete set of received statistical objects found in the aggregate statistical object. Once the original object is unambiguously identified, the process moves on to calculating the statistical probability of guessing the information in the aggregate statistical object. If the original object is not unambiguously identified, nothing further is done at such time and the system awaits the reception of another statistical object with related communications characteristics to increase the number of bits of information received, and again aggregates this information into an aggregate statistical object; the process then repeats itself.

Calculating the probability of guessing the information in the aggregate statistical object requires the number of bits of statistical objects that have been received and aggregated and the number of statistical objects maintained in the table of all valid statistical objects. The specific probability p of a collision is $$p(n; d) = \frac{d!}{d^n (d-n)!}$$

where n is the number of statistical objects in the table of valid statistical objects and d is the total number of unique statistical objects in the cache plus the attack counter values for attacks occurring during the token validity period. For general use, the approximation $p(n;d) \approx 1 - e^{-n^2/(2 \times d)}$ is used. The total number of unique statistical objects available d is $d = 2^b$ where b is the number of bits of statistical object information received.\d 17

Once the probability has been calculated, it is compared with a probability threshold. If the calculated probability is less than the probability threshold, then the statistical object has been identified with a confidence that the aggregate information received does not exceed the probability threshold set beforehand. If the probability exceeds the threshold, nothing further is done, and the system awaits the reception of another statistical object with related communications characteristics to increase the number of bits of information received, and aggregates the information into the accumulated statistical object; the process then repeats itself.

A further optimization can be made by associating communications characteristics across multiple identifications of statistical objects. When a statistical object is identified and does not exceed the probability threshold, thereby confirming that it was generated from the original object, the communications characteristics are temporarily associated with that original object. When a subsequent statistical object with similar or identical communications characteristics is received, the subsequent received statistical object is checked against the associated original object. If the associated original object could produce the received statistical object, the statistical object is identified as being produced by the associated original object. When multiple original objects are associated with the same set of communications characteristics, the identification of the statistical object proceeds by aggregating the statistical object information and pruning the list of potential original objects until only a single original object remains. The statistical object is still aggregated in an aggregated statistical object to enable the aggregation of information for the probability calculation. The probability calculation is made using the number of bits of information received in the aggregate statistical object and the number of statistical objects that are associated with the communications characteristics that are associated with the original object. This results in a smaller amount of statistical object information being required to not exceed the probability threshold, because the communications characteristics are being used as an additional discriminator. Multiple sets of communications characteristics can be associated with original object and multiple original objects can be associated with a single set of communications characteristics. When a statistical object is identified as being produced by an original object, a timestamp or other mechanism for indicating recent activity is updated in the communications characteristics associated with the original object. A lack of communications characteristics associated with original objects after a period of time should have their association removed after such periods of inactivity exceed a threshold. Subsequent statistical object reception with those removed communications characteristics will proceed as unassociated communications until those communications are again associated with an original object.

To ensure that the security of the statistical objects being produced cannot be readily captured, copied, and replayed as original, the algorithms used to generate the statistical objects may use additional information beyond the original object as inputs. This additional information may include, e.g., clock values (timestamps), counters, and other deterministic inputs. During the identification of a statistical object with an original object, this additional information is also identified and used to further validate the identity of the original object.

A probability threshold has several unique uses. Firstly, the use of a probability threshold enables a system for statistical object identity to be used with varying numbers of statistical objects contained within the table of all valid statistical objects, without having the probability of guessing a statistical object increase as statistical objects are added to the valid statistical object table. The system used herein simply requires additional statistical objects, thus increasing the amount of information available to maintain the desired probability. A second unique attribute of using the probability threshold is that the probability threshold can be changed by the entity performing statistical object identification without communication, knowledge, or coordination of the change with the entity generating the statistical object. This is especially important in the context of cyber security where knowledge of a threat or attack may raise the level of security desired. This can be used by the entity receiving the statistical object and performing statistical object identification to decrease the threshold, requiring more statistical information before the original object identity is confirmed. The ability to perform this function without requiring any communication with or notification to the entity producing the statistical object is especially useful.

Additional information can also be conveyed using statistical objects. When additional inputs are used in the generation of the statistical object, this information can be extracted during the statistical object identification process. Examples of such additional information includes, but is not limited to, information regarding the state of some system or process, an index into a table of information or other types of data.

II. Overview

One limitation of information networks known in the art prior to the present disclosure is that it is difficult to verify or approve a communication before the communication has been allowed to penetrate the network. One reason for this difficulty is that the means of verification, which is called a "certificate," is too large to send to the network in the initial set of digital information which initiates the communication, and which ultimately leads to an authentication.

An example embodiment according to the present disclosure solves the foregoing problem by reducing the information in the certificate which is used to authenticate the communication before it is allowed to proceed (enter the system or network) by converting the certificate to a much smaller "statistical object." The foregoing method allows the network to determine the identity of the initiator of the communication before the communication is given access to the system or network. This method provides a security feature that substantially eliminates potentially detrimental or malicious attacks that could be perpetrated against the network using conventional identification technology.

An example embodiment according to the present disclosure relates to a method for authenticating a communication. In an example set forth in Section VI herein, a communication between a user (referred to as "Ben") and a remote system is described. Communications received by the remote system are authenticated before they are allowed. In this disclosure, the terms "authenticate", and "authentication" are intended to mean that the identity of a communicator or an initiator of a communication has been verified, and that a particular communication is permitted, allowed or otherwise approved to proceed into the remote system.

Definitions

As used herein, certain terms are defined as follows:

Agent—A software agent is a computer program that acts for a user or other program in a relationship of agency Aggregate Statistical Object—A data structure containing one or more statistical objects, a list of potential original objects that may have created the original object(s) and the communications characteristics that provide the association between multiple statistical objects.

Attack—A failed authentication. With respect to the present disclosure, a failure to match at least one of a plurality of statistical objects.

Authentication—The act of confirming the truth of an attribute claimed true by an entity. Operationally, authentication is the verification that the offered identity credential is authentic and valid for user, process, or device, often as a prerequisite to allowing access to resources in an information system.

Authenticating Device—A device that verifies the identity of a user, process or device.

Authentication Information—Information provided for the purpose of verifying the identity of a user, process, or device.

Brute Force Attack—An attack where the attacker submitting as many attempts as possible. With respect to the present disclosure, in a brute force attack, the attacker submits statistical objects created without knowing the original object.

Communication—A communication is one or more messages conveyed in either direction between the communicating parties.

Communications Characteristics—Any of the characteristics, both physical and logical, that are available to distinguish one communication from another and to group discrete communication events into one or more related sequences of communications events.

Connection—A logical pairing of two devices that enable them to communicate. A connection utilizes a series of packets to accomplish this. A TCP connection is an example of a connection.

Connection Request—A request by one device to another device to create a connection.

Device—A device is any object that is capable of being attached or wirelessly connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity—A digital representation of a set of characteristics by which a user, process or device is uniquely recognized.

Hash or Hashing function—Any procedure or mathematical method that converts are large amount of data into a smaller amount of data. In an example embodiment of the present disclosure, the output may be a single integer or value which serves as an index to an array or database.

Identity—An identity is a collection of attributes about an entity that distinguish it from all other entities. Entities are anything with distinct existence, such as people, or devices.

Identity Credential—An identity credential is a set of claims made by an entity about an identity.

IP is the Internet Protocol. The Internet Protocol is a data-oriented protocol used by devices to communicate across a packet switched network. IP information is carried by an IP header in an IP packet. The IP header contains device address information, protocol control information and user data information.

Network—A network is a collection of computers, servers, clients, routers, and devices that are connected together such that they can communicate with each other. The Internet is an example of a network.

Object Activation Agent—A software agent that requests keying information from an Object Activation Service.

Object Activation Service—A service that provides keying information to an Object Activation Agent.

Original Object—The inputs to the function that generates a statistical object. The original object can include additional inputs such as clocks, counters, nonces and other deterministic information.

Protocol—In the field of telecommunications, a protocol is the set of standard rules for data representation, signaling, authentication, error detection and other features required to send information over a communications channel. Not all protocols provide all these features. Protocols with different features may be layered on top of one another to provide a more robust feature set. Examples of protocols are the IP protocol and the TCP protocol. These protocols are often used together and referred to as the TCP/IP protocol.

Public Key Infrastructure (PKI)—A set of policies, processes, server platforms, software and workstations used for the purpose of administering certificates and public-private key pairs, including the ability to issue, maintain, and revoke public key certificates.

PKI Certificate—A set of data that uniquely identifies an entity, contains the entity's public key, and is digitally signed by a trusted party, thereby binding the public key to the entity. Public Key Identity (PKI) certificates are composed of a public key and a private key. The private key is never communicated and, as its name suggests, is kept private. Two entities using or otherwise utilizing PKI certificates exchange public keys, enabling them to determine a shared secret without exposing their private keys. This shared secret is then used for cryptographic purposes such as encryption and authentication. Because the private key is never shared, participants in public key cryptography do not have the ability to impersonate the remote PKI certificate.

Protocol Entity—A device, function, process, or procedure that implements a communications protocol.

Security Protocol—A security protocol is a protocol that performs a security function or a combination of functions such as data confidentiality, integrity, or authentication. Security protocols usually employ cryptographic functions in their operation.

SOI—Statistical Object Identification

SOI Insertion Policy Service—A service that generates statistical objects from an original object and inserts the generated statistical object into a message.

SOI Policy Service—A service that receives a message, extracts a statistical object and uses a local SOI resolution service to perform statistical object identification to determine the original object.

SOI Resolution Service—A service that uses SOI to determine an original object from a statistical object.

Statistical Object—The output of a function that has a statistical distribution. Commonly, a statistical object is the output of a hashing function.

Symmetric Key—A cryptographic key that is used to perform both the cryptographic operation and its inverse, for example to encrypt and decrypt, or create a message authentication code and to verify the code.

Symmetric Key Authentication—An authentication algorithm that uses a symmetric key to create a message authentication code and to verify the code.

TCP—is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

III. Example Embodiments

Figure 4:
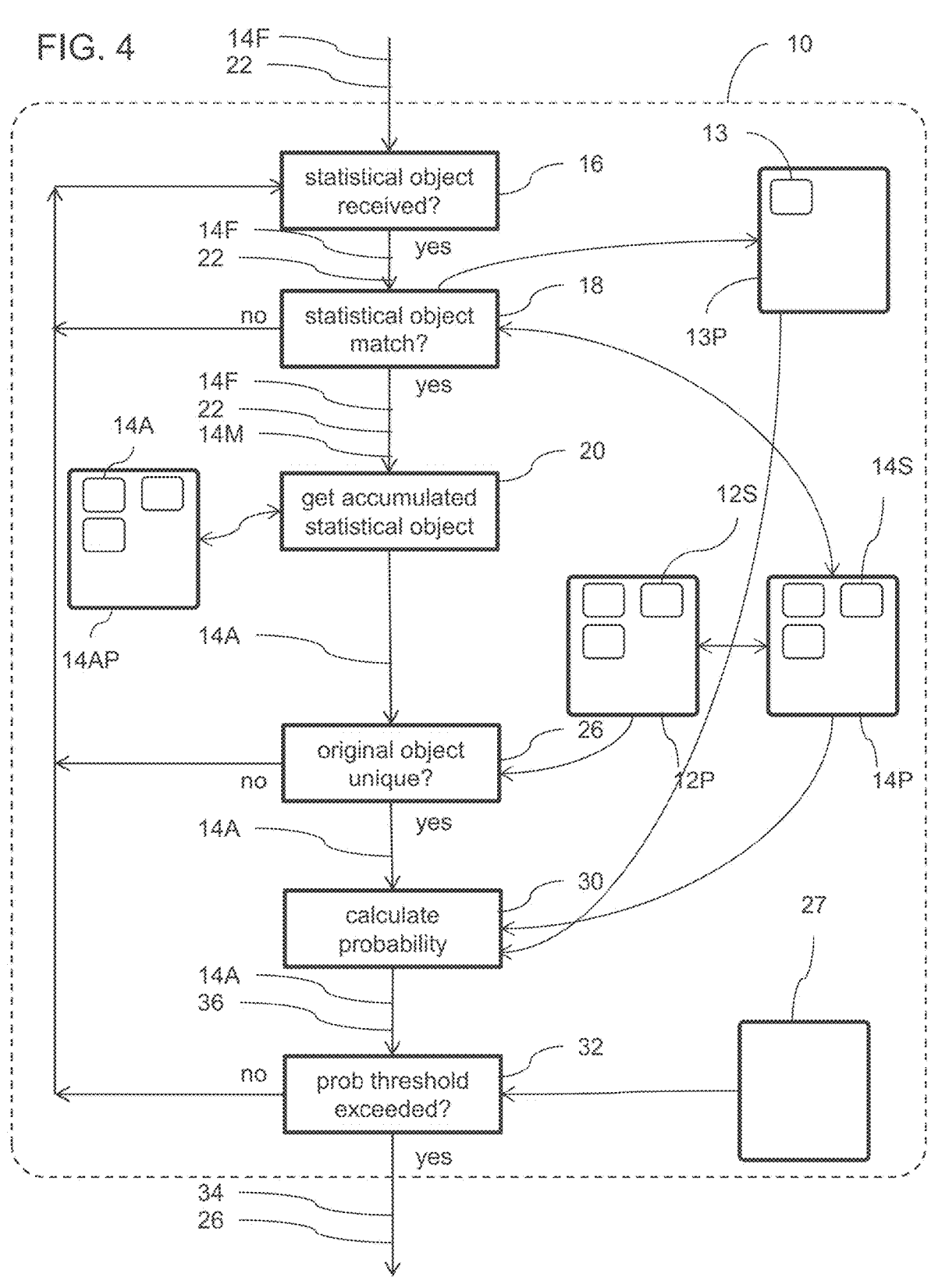
FIG. 4 is an illustration which shows an embodiment according to the present disclosure.

FIG. 4 shows one example embodiment according to the present disclosure, which includes a device 10 intended to communicate with at least one user. As user herein, "connected to" may be direct electrical connection, or connection through one or more intermediate electronic components or systems. In a more general sense, logical components described herein having particular functions may be in signal communication with other logical components of the described device 10. The logical components are not limited to any specific configuration of physical circuitry except as would be understood by those skilled in the art as requiring specific physical components to execute the ascribed logical functions. The logical components may be implemented on one or more or, for example and without limitation, a microcomputer, microprocessor, field programmable gate array, and/or application specific integrated circuit(s).

The device 10 stores and/or processes at least one original object 12S and at least one corresponding statistical object 14S based on the at least one original object (e.g., 12S), e.g., as may be created by application of a hash function. In some embodiments, the device 10 stores and/or processes a plurality of original objects 12P and a plurality of associated statistical objects 14P. In this disclosure, a single original object is identified as 12S (S for singular), while a plurality of original objects is identified by 12P (P for plurality). In this disclosure, a single statistical object is identified as 14S (S for singular), while a plurality of statistical objects is identified by 14P (P for plurality). The term "device" is intended to encompass any suitable means for conveying and/or storing information or data. In an example described in Section VI, the device 10 is a remote system, that is, at a location physically separated from one or more users. In the embodiments described below, the device 10 includes all the other components subsequently described herein.

In an example embodiment, the device 10 includes a communications receiver 16 which is in signal communication with an external network, and with a statistical object matcher 18. The statistical object matcher 18 is in signal communication with an accumulated statistical object selector 20 and has access to the plurality of statistical objects 14P stored in the device 10. The statistical object matcher 18 has access to and makes a plurality of attack measurements 13P. The accumulated statistical object selector 20 is in signal communication with an original object identifier 26 and has access to a plurality of accumulated statistical objects 14AP (which may be stored on the device 10 as explained above). The original object identifier 26 is in signal communication with a probability calculator 30 and has access to the plurality of original objects 12P. The probability calculator 30 is in signal communication with a threshold comparator 32 and has access to the plurality of statistical objects 14P and a plurality of attack measurements 13P. The threshold comparator 32 provides the output of the device 10 and has access to a probability threshold value 27 (which may be stored on the device 10 or communicated from elsewhere).

Figure 5:
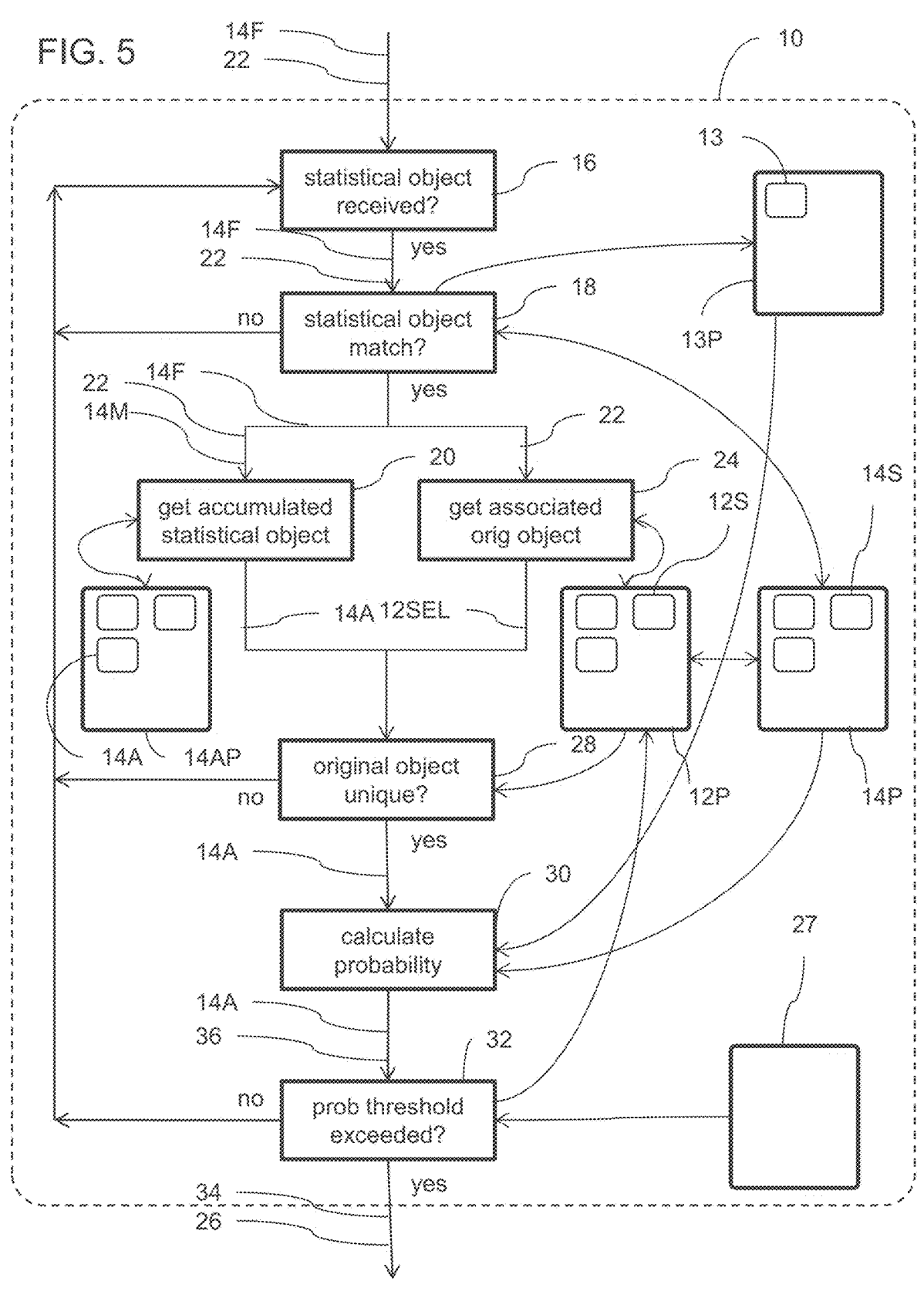
FIG. 5 is an illustration which shows another embodiment according to the present disclosure.

FIG. 5 shows another example embodiment including a device 10. Within the device 10, a plurality of original objects 12P is used to generate a plurality of statistical objects 14P. A communications receiver 16 may be associated with or located within the device 10 and is in signal communication with the output of the device 10 and to a statistical object matcher 18. The statistical object matcher 18 is in signal communication with an accumulated statistical object selector 20 and an associated original object selector 24, and has access to the plurality of statistical objects 14P and a plurality of attack measurements 13P. The accumulated statistical object selector 20 is in signal communication with an associated original object identifier 28 and has access to a plurality of accumulated statistical objects 14AP. An associated original object selector 26 is in signal communication with an associated original object identifier 28 and has access to a plurality of original objects 12P. The associated original object identifier 28 is in signal communication with a probability calculator 30 and has access to the plurality of statistical objects 14P. The probability calculator 30 is in signal communication with the threshold comparator 32 and has access to the plurality of statistical objects 14P and a plurality of attack measurements 13P. The probability calculator 30 is connected to the output of the device 10 and has access to a threshold probability value 27 and the plurality of original objects 12P.

As explained above, the foregoing individual components of the example embodiments of the device 10 are to be understood as logical components having particular functions. The logical components are not limited to any specific configuration of physical circuitry except as would be understood by those skilled in the art as requiring specific physical components to execute the ascribed logical functions to each such logical component.

IV. Methods for Statistical Object Identification

Having shown in general form components of a device to perform statistical object identification, example embodiments of a method for operating the device will now be explained. In one example embodiment, the device 10 contains (e.g., stores on a computer readable medium) a plurality of original objects 12P. For each original object 12S, at least one statistical object 14S is generated. Multiple statistical objects 14P may be generated from any one or more of the single original objects 12S (e.g., as a result of repeated application of a hash function on the same original object), and each corresponding statistical object 14S has a name, pointer, or other indication of the original object 12S from which it was created. The first statistical object generated from an original object 12S is referred to as a first statistical object 14F. Since multiple statistical objects 14P may be created from a single original object 12S, multiple pointers or other indications to the additional inputs to the statistical object generator (e.g., hash function) may also be provided. These additional inputs may include clock information, keying information, state information, and other relevant and useful information. The plurality of statistical objects 14P generated from the plurality of original objects 12P may be maintained and may be available within the device 10, e.g., on a computer readable medium. The plurality of statistical objects 14P may be individually or as a group, periodically removed, added to, invalidated, or otherwise refreshed. Likewise, the plurality of original objects 12P may be individually or as a group removed, added to, invalidated, or otherwise refreshed.

When a first statistical object 14F is received by the communications receiver 16, it is received within the context of a device-to-device or other digital communication and has communications characteristics 22 associated with it. These communication characteristics 22 may include, for example, the network address of the sender of the communication, the physical interface or port upon which the communication was received and the logical interface upon which the communication was received. For network communications, communications characteristics 22 may include, e.g., the IPV4 or IPv6 address of the sender, session information including local and remote addresses and local and remote port numbers, VLAN identifiers and other network, protocol stack and application information. Communications characteristics 22 may also include security association information. Physical characteristics of the communications characteristics 22 may include the frequency or frequencies that the communication was received. Physical characteristics of communications characteristics 22 may also include phase information, time information and amplitude information.

After a first statistical object 14F has been received, it is communicated to a statistical matcher 18, wherein the first statistical object 14F is compared with the plurality of statistical objects 14P. If a matching statistical object 14M is not found in the comparison, the first statistical object 14F is not identified and no further statistical object resolution activity occurs on this reception of the first statistical object 14F. As will be explained further below, if no matching statistical object is found, the device 10 makes no further statistical object resolution activity occurs on this reception of a statistical object, identifies the reception of the first statistical object 14F as an attack, makes an attack measurement 13 and adds the attack measurement 13 to the plurality of attack measurements 13P. An attack measurement 13 includes the timestamp of the attack. The timestamp of the attack is used to exclude older attack measurements 13 when they are no longer relevant. If there is at least one statistical object 14S (i.e., one or more matching statistical objects 14M) in the plurality of statistical objects 14P that matches the first statistical object 14F, then the first statistical object 14F, all matching statistical objects 14M and indicators to their respective original objects 12P, and the communications characteristics 22 are passed to an accumulated statistical object selector 20. The accumulated statistical object selector 20 takes the input communications characteristics 22 and searches for an accumulated statistical object 14A within a plurality of accumulated statistical objects 14AP that has matching communication characteristics 22. If a matching accumulated statistical object 14MA is found, the first statistical object 14F and the list of all original objects 12P associated with the matched statistical objects 14M are added to the matched accumulated statistical object 14MA. This increases the amount of statistical object information. If a matching accumulated statistical object 14MA is not found, a new accumulated statistical object 14NA is created and added to the plurality of accumulated statistical objects 14AP. The communications characteristics 22 of the accumulated statistical object 14A are copied from the communications characteristics 22, the first statistical object 14F and the list of all original objects 12P associated with the matched statistical objects 14M are added to the accumulated statistical object 14A. In both cases, the resulting accumulated statistical object 14A is passed to the original object identifier 26.

If an accumulated statistical object 14A is inactive for a predetermined period of time, the accumulated statistical object 14A may be removed from the plurality of accumulated statistical objects 14AP. An accumulated statistical object 14A may be considered inactive, for example, if it has not unambiguously identified a unique original object 12S, and first statistical objects 14FP with matching communications characteristics 22 have not been received for a predetermined period of time. An accumulated statistical object 14A may also be considered inactive if it has selected a unique original object 12S, but the accumulated statistical object 14A exceeds a probability threshold value 27, and first statistical objects 14F with matching communications characteristics 22 have not been received for a predetermined period of time.

The original object identifier 26 takes the given accumulated statistical object 14A and determines if accumulated statistical information within the accumulated statistical object 14A could only be generated by a single, unique original object 12S. This determination is made by successively removing ("pruning") associated original objects, that as additional statistical object information is added, fail to be able to generate the stream of statistical objects that matches the received statistical objects until only a single original object 12S remains. If a unique original object 12S is not determined, the accumulated statistical object 14A is updated with the pruned list of associated original objects 12P, and no further statistical object resolution activity occurs on this particular reception of a statistical object. If a unique original object 12S is determined, it is selected by the original object identifier 26 and the selected original object 12SEL is indicated in the accumulated statistical object 14A. The accumulated statistical object 14A is then sent to a probability calculator 30. The probability calculator 30 takes the given accumulated statistical object 14A, and based on the number of bits of statistical object information that has been accumulated in the accumulated statistical object 14A, the number of statistical objects in the plurality of statistical objects 14P, and the accumulated attack measurement 13A. calculates a probability of guessing (e.g., such as by an attacker generating in some form) the accumulated statistical object 14A information. The accumulated attack measurement 13A is the sum of the plurality of attack measurements 13P. The calculated probability 36 is sent to the threshold comparator 32. The threshold comparator 32 takes the given calculated probability 36 and compares that value with the probability threshold value 27. The probability threshold value may 27 be taken from an original object 12S, may be a configurable value for the plurality of original objects 12P within, associated with or accessible to the device 10, or may be controlled by an outside entity. If the threshold comparator 32 determines that the calculated probability 36 exceeds the probability threshold value 27, no further statistical object resolution activity occurs on this reception of that particular statistical object 14S. If the threshold comparator 32 determines that the calculated probability 36 is less than the probability threshold value 27, an indication 34 is produced that includes the selected original object 26SEL. The indication 34 may also include the communications characteristics 22 and any other available information required by the receipt of the indication 34. Other information may include the calculated probability 36, the probability threshold value 27, the time that the corresponding first statistical object 14F was received, or other information, states, statistics, and associated information. The indication may also contain additional inputs to the statistical object generator, which may be provided by pointer from a statistical object 14S. These additional inputs may include clock information, keying information, state information, and other relevant and useful information.

By utilizing a probability threshold value 27, a threshold comparator 32 and calculating, in real time, the present probability of guessing an accumulated statistical object 14A based on the number of statistical objects present in the plurality of statistical objects 14P, the probability of guessing an accumulated statistical object 14A is held constant while the number of statistical objects present in the plurality of statistical objects 14P can vary. Likewise, the probability of guessing a first statistical object 14F is also held constant. It should be noted that the probability threshold value 27 can be changed at any time. A change in the probability threshold value 27 does not require communication or coordination with the generator (e.g., remote device operated by a user) of the first statistical object 14F. Because of this, the probability threshold value 27 can be adjusted, and the system for statistical object identification will not provide any response until the threshold value has been met. This effectively allows the statistical object identification system to increase or decrease the probability threshold value 27 without providing any detectable indication of the change in the probability threshold value 27.

In another embodiment, a device 10 contains a plurality of original objects 12P. For each original object 12S, at least one statistical object 14 is generated. Multiple statistical objects 14 may be generated from a single original object 12S and each statistical object 14 contains a name, pointer or other indication of the original object 12S from which it was created. The first statistical object generated from an original object 12S is referred to as a first statistical object 14F. The plurality of statistical objects 14P generated from the plurality of original objects 14P is maintained and is available within the device 10. The plurality of statistical objects 14P may be individually or as a group periodically removed, added to, invalidated or otherwise refreshed. Likewise, any one or more of the plurality of original objects 12P may be individually or as a group removed, added to, invalidated or otherwise refreshed.

When a first statistical object 14S is received by a communications receiver 16, it is received within the context of a communication and has communications characteristics 22 associated with it. After a first statistical object 14F has been received, using a statistical matcher 18, the first statistical object 14F is compared against the plurality of statistical objects 14P. If a matching statistical object 14M is not found, the first statistical object 14F is not identified and no further statistical object resolution activity occurs on this reception of a statistical object, identifies the reception of the first statistical object 14F as an attack, makes an attack measurement 13 and adds the attack measurement 13 to the plurality of attack measurements 13P. An attack measurement 13 includes the timestamp of the attack. The timestamp of the attack is used to exclude older attack measurements 13 when they are no longer relevant. If there is at least one statistical object 14S in the plurality of statistical objects 14P that matches the first statistical object 14F, the first statistical object 14F, all matching statistical objects 14P and indicators to their respective original objects 12P and the communications characteristics 22 are passed to an accumulated statistical object selector 20. The communications characteristics 22 are also communicated to an associated original object selector 28.

The accumulated statistical object selector 20 takes the input communications characteristics 22 and looks for an accumulated statistical object 14A within the plurality of accumulated statistical objects 14AP that has matching communication characteristics 22. If a matching accumulated statistical object 14MA is found, the first statistical object 14F and the list all original objects 12P associated with a corresponding matched statistical object 14M are added to the matched accumulated statistical object 14MA. This increases the amount of statistical object information. If a matching accumulated statistical object 14MA is not found, a new accumulated statistical object 14N is created and added to the plurality of accumulated statistical objects 14AP. The communications characteristics 22 of the accumulated statistical object 14A are copied from the communications characteristics 22, and the first statistical object 14F and the list of all original objects 12P associated with the matched statistical objects 14M are added to the accumulated statistical object 14A. In both cases, the resulting accumulated statistical object 14A is passed to the associated original object identifier 28

The associated original object selector 24 takes the input communications characteristics 22 and looks for an original object 12S within the plurality of original objects 12P that has matching communications characteristics. If a matching original object 12M is found, that original object is selected, becoming a selected original object 12S and is passed to the associated original object identifier 28. If there is no matching original object 12M, then nothing is passed to the associated original object identifier 28. If an original object 12S is inactive for a period of time, the association with communications characteristics 22 may be removed from the original object 16. An original object 12S may be considered inactive if first statistical objects 14F with matching communications characteristics 22 have not been received for a period of time. An original object 12S may also be considered inactive if first statistical objects 14F produced by the associated original object 12S have not been received for a period of time.

The associated original object identifier 28 takes the given accumulated statistical object 22 and the selected original object 12SEL and determines if the accumulated statistical information within the accumulated statistical object 14A could have been produced by the selected original object 12SEL. If the information contained within the accumulated statistical object 14A could have been generated by the selected original object 12SEL, the selected original object 12SEL is indicated in the accumulated statistical object 22 and the accumulated statistical object 14A is sent to the probability calculator 30. If the information contained within the accumulated statistical object 14A could not have been produced by the selected original object 12SEL, the selected original object 12SEL is discarded and the following processing occurs.

The associated original object identifier 28 takes the given accumulated statistical object 14A and determines if the accumulated statistical information within the accumulated statistical object 14A could only be generated by a single, unique original object 12S. This determination is made by successively pruning associated original objects that, as additional statistical object information is added, fail to be able to generate the stream of statistical objects that matches the received statistical objects until only a single original object remains. If a unique original object 12S is not determined, the accumulated statistical object 14A is updated with the pruned list of associated original objects 12P and no further statistical object resolution activity occurs on this reception of a statistical object. If a unique original object 12S is determined, the selected original object 12SEL is indicated in the accumulated statistical object 14A and the accumulated statistical object 14A is sent to the probability calculator 30. The probability calculator 30 takes the given accumulated statistical object 14A and based on the number of bits of statistical object information that has been accumulated in the accumulated statistical object 14A, the number of statistical objects 14 in the plurality of statistical objects 12P that have matching communications characteristics 22 and the accumulated attack measurement 13A. calculates a probability of guessing (e.g., such as by an attacker generating in some form a large number of statistical objects) the accumulated statistical object 14A information. The accumulated attack measurement 13A is the sum of the plurality of attack measurements 13P., The calculated probability 36 is sent to the threshold comparator 32. The threshold comparator 32 takes the given calculated probability 36 and compares that value with the probability threshold value 27. The probability threshold value 27 may be taken from an original object 12S, may be a configurable value for the plurality of original objects 12P within device 10 or may be controlled by an outside entity. If the threshold comparator 32 determines that the calculated probability 36 is greater than the probability threshold value 27, no further statistical object resolution activity occurs on this reception of a statistical object. If the threshold comparator 32 determines that the calculated probability 36 is less than the probability threshold value 27, an indication 34 is produced that includes the selected original object 12SEL and an association is made within the plurality of original objects 12P between the selected original object 12SEL and the communications characteristics 22. The indication 34 may also include the communications characteristics 22 and any other available information required by the received of the indication 34. The association between an original object 12S and communications characteristics 22 can also be created prior to receiving a first statistical object 14F. This allows the system to be pre-populated with associations that should accelerate the selection of original objects 12S and facilitate staying beneath the probability threshold value 27.

In addition to the example embodiments described above, there are a number of additional processes that may be used to assist the example described processes. As the primary mechanism for accumulating information between related statistical objects is driven by the reception of those statistical objects, it is therefore important to consider how to handle a partially identified statistical object which is then orphaned. An orphaned partially identified statistical object is an aggregate statistical object that has not been fully identified or has exceeded the probability threshold when the reception of matching communications characteristics ceases, thereby preventing further progress. For this case, each accumulated statistical object 14A should have a timestamp or similar aging construct that will enable the system to periodically age out idle, orphaned and otherwise unused statistical and original objects. This includes the removal of communication characteristics 22 that have been associated with original objects 12P after matching communications have been idle for a period of time.

As the communications of statistical objects is usually performed when the secured transport of an original object cannot be accomplished, it is therefore important that the security and integrity be taken into account in any implementation. To ensure that a statistical object cannot be intercepted during transmission and used by the interceptor, once a statistical object 14S matched from the plurality of statistical objects 14P, then that statistical object 14S should be invalidated and the device 10 should generate a new, different statistical object 14S from the same original object 12S. To further protect against attack, each statistical object 14S should also expire after a period of time if that statistical object 14S has not been matched and subsequently invalidated.

In an example embodiment, statistical objects 14S expire in groups where the group is defined by a period of time. For instance, if statistical objects 14S have lifespan of 4 seconds, then every four second, the plurality of statistical objects 14P is allowed to expire (i.e., is purged).

In an example embodiment, the device 10 may keep a window of multiple statistical object time periods to address clock drift and clock skew between physically separate communication components. For example, if statistical objects 14S have a lifespan of 4 seconds, and the device 10 maintains a window of 3 periods for a total of 12 seconds, then every 4 seconds, a portion of the plurality of statistical objects 14P are timed out and removed from the plurality of statistical objects 14P.

Figure 25:
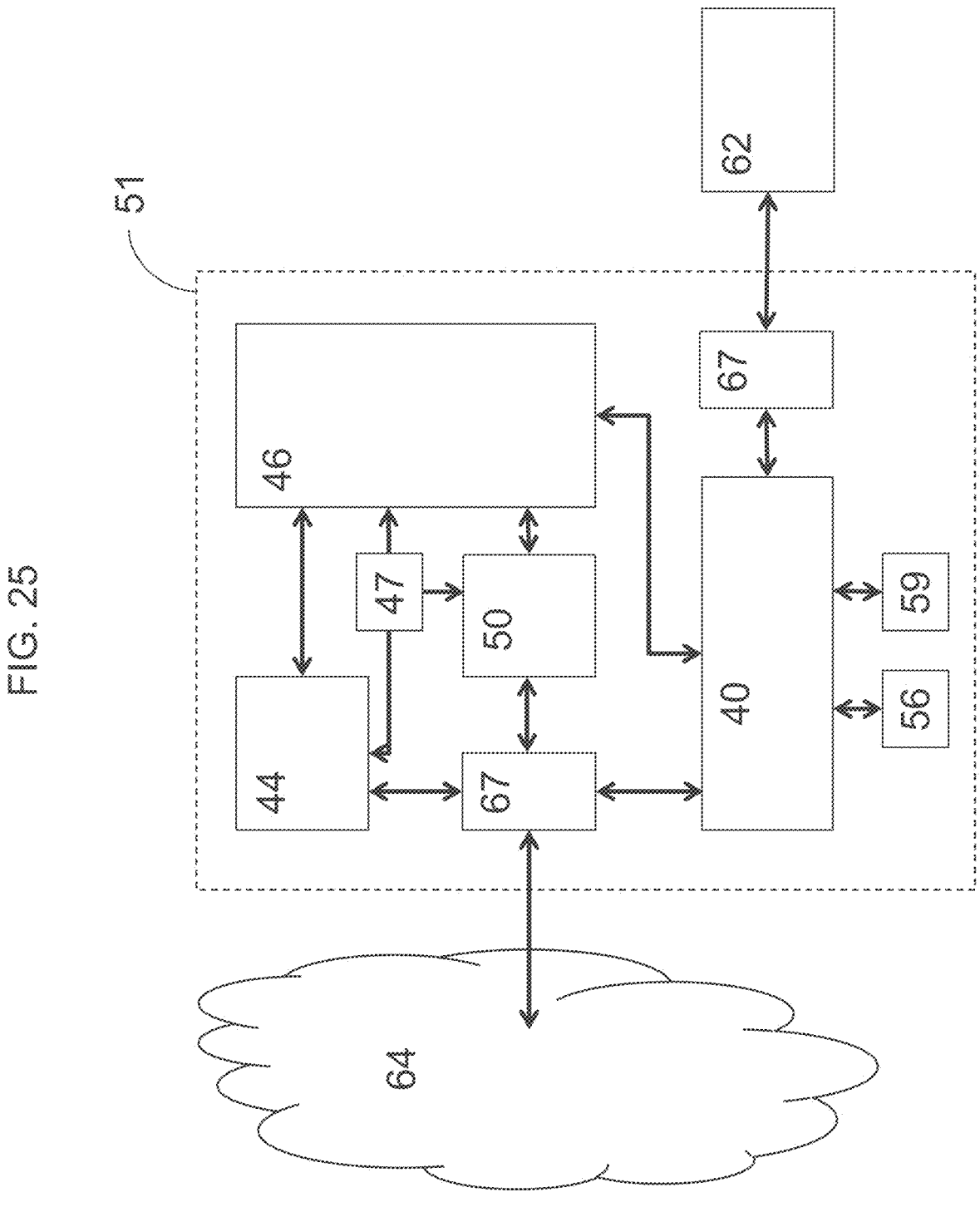
FIG. 25 is an illustration which shows an embodiment of the present disclosure, an integrated SOI system.

In an example embodiment, the device 10 also maintains the plurality of attack measurements 13P, where the timestamps of the attack measurements are congruent with the lifespan of the statistical objects 14S. When the device 10 times out statistical objects 14S as described above, it also times out attack measurements 13 with timestamps within the expiration time of the timed out statistical objects 14S. In FIG. 25, when time period 38(2) starts, the statistical objects 14S and the attack measurements 13 that are older than time period 38(2) are timed out. In FIG. 25, time advances to the right and the oldest entries are on the left. Thus, when time period 38(2) begins, statistical objects 14a(0), 14b(0), 14c(0), and attack measurement 13(0) are timed out and removed from their respective plurality of statistical objects 14P and plurality of attack measurements 13P.

The association of communications characteristics 22 is usually performed after the successful identification of an original object 12S and after the calculated probability 36 is determined to be less than the probability threshold value 27. It is also possible to pre-assign communications characteristics 22 to original objects 12P. This will decrease the amount of statistical object 14S information needed to identify the associated original object 12S. Unlike dynamically associated communication characteristics, pre-assigned associations should not expire after periods of inactivity.

The foregoing method of statistical object identification allows the system to maintain a constant probability threshold, regardless of the number of statistical objects that are contained within the plurality of statistical objects. This is accomplished by always calculating the probability of guessing the information contained in the accumulated statistical object with respect to both the number of statistical objects that are contained within the plurality of statistical objects and the accumulated statistical object information. As the number of statistical objects in the plurality of statistical objects increases, the probability of guessing increases while as the amount of statistical object information accumulates, the probability of guessing decreases. By comparing the result of the probability calculation against the probability threshold after each reception of a statistical object that results in an identified original object, adherence to the probability threshold is enforced.

The foregoing method of statistical object identity is designed to specifically enable the changing of the probability threshold and not require that the changed probability threshold be coordinated or otherwise communicated with the entities that are generating and sending the statistical objects. By not requiring any coordination or communication when changing the probability threshold 27, the device 10 can change the probability threshold 27 in response to other external factors such as the threat or presence of attack or other security or integrity event.

V. Apparatus for Statistical Object Identification

The apparatus that performs statistical object identification may be varied and diverse. It ranges from a simple, single function device that receives statistical objects via a network or other communications medium, and identifies the original object. Once the identification is made, the communication may be forwarded to its intended destination. Before identification is made, no communications are allowed to pass across the device. It is expected that in many cases, the apparatus will be a module or subsystem within a larger system. This module may take the form of a state machine in an application specific integrated circuit (ASIC) or other form of integrated circuit or semiconductor implementation. This module may also take the form of logic coding provided to a programmable logic device such as a field programmable gate array (FPGA), programmable array logic (PAL) and other forms of programmable logic. This module may also take the form of instructions for a microprocessor. The module may also take the form of instructions to a synthetic or virtual processor or machine.

The apparatus that performs statistical object identification may be used in communications devices, security devices, network routing devices, application routing devices, service delivery devices and other devices that are enabled by the addition of the efficient communication of an original object through the reception of a statistical object which is identified as being generated from an original object.

VI. Examples

One specific, simplified example according to the present disclosure is described below. The following example offers a description of:

1. an original object 12S;
   2. how that original object 12S is transformed into a statistical object 14S; and
   3. how that statistical object 14S is identified as having been generated by the original object 12S.

The numbering convention that is used in this Specification, the Drawings, and the Claims to identify original and statistical objects is presented in Table 1

TABLE 1

| | |
|---|---|
| 10 | Device (In this example, the Remote System) |
| 12M | Matched Original Object |
| 12P | Plurality of Original Objects |
| 12S | Original Object |
| 12SEL | Selected Original Object |

TABLE 1-continued

| | |
|---|---|
| 14A | Accumulated Statistical Object |
| 14AP | Plurality of Accumulated Statistical Objects |
| 14F | First Statistical Object |
| 14N | New Statistical Object |
| 14S | Statistical Object |

The letter "S" is used to identify a single object, while the letter "P" is used to represent a plurality of objects. The reference character that refers to an original object includes the numeral "12", while the numeral "14" is used to refer to a statistical object.

Figure 6:
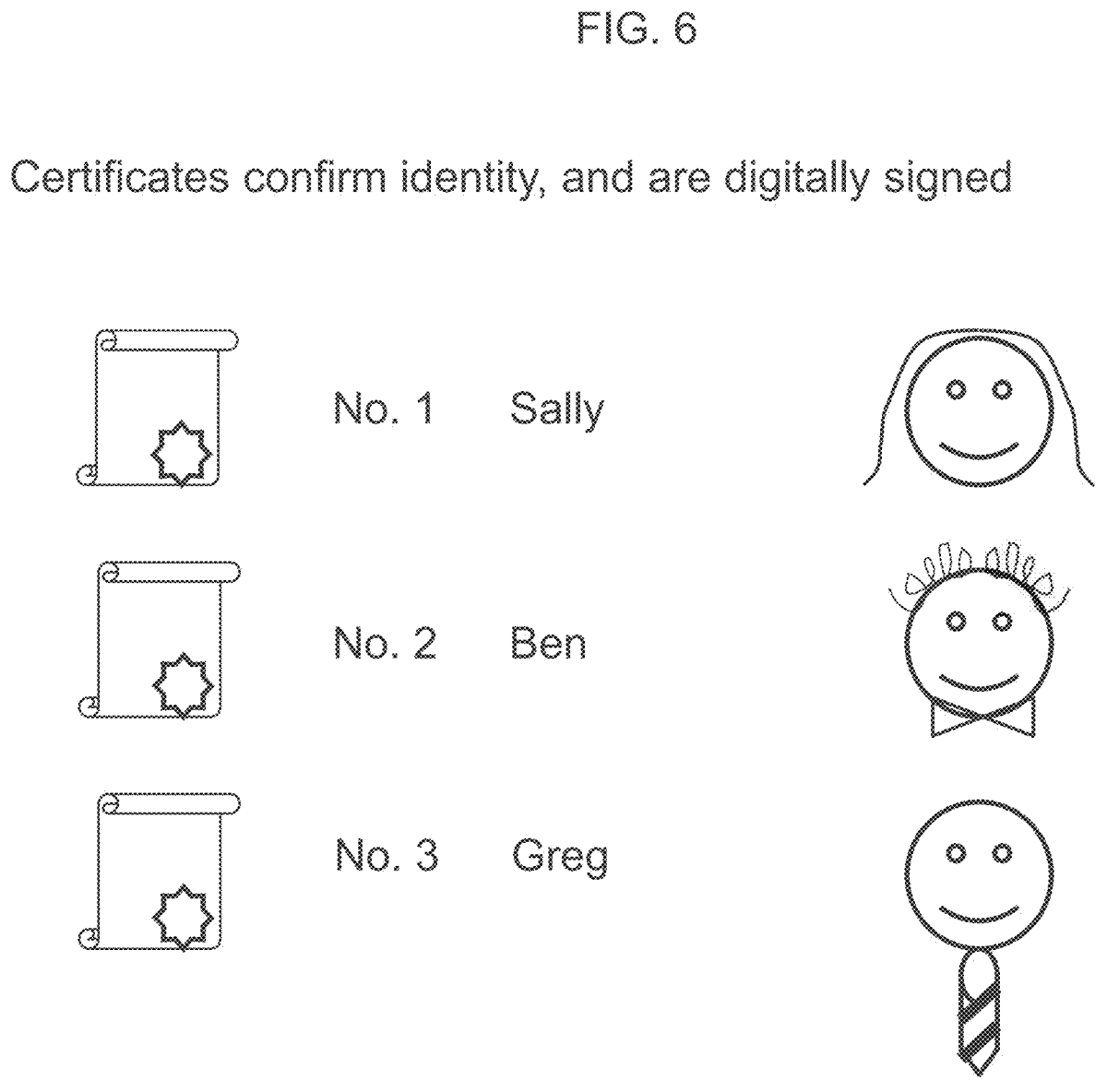
Figure 8:
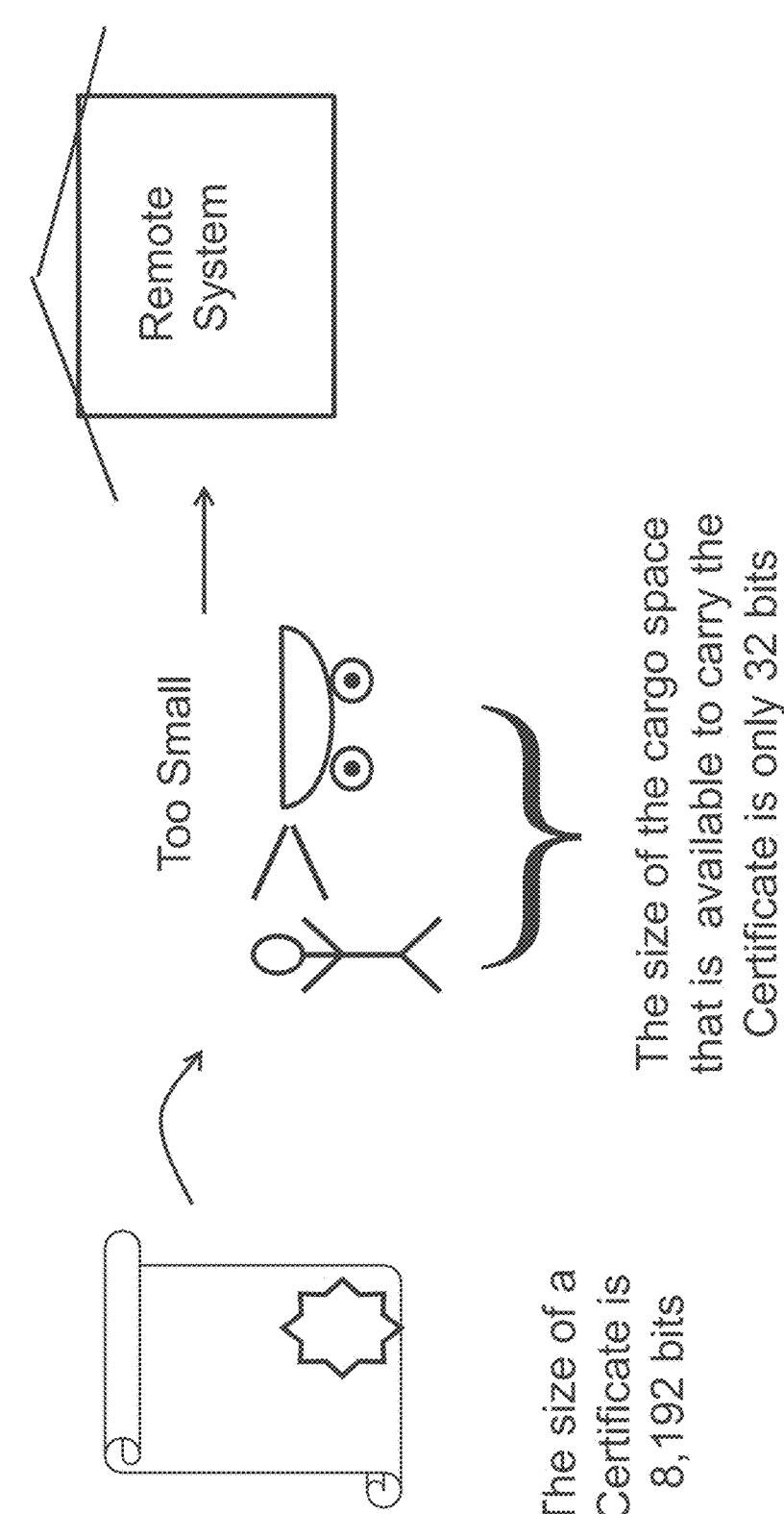
FIG. 8 shows that certificates are too large to send to the remote system in their original form.
Figure 9:
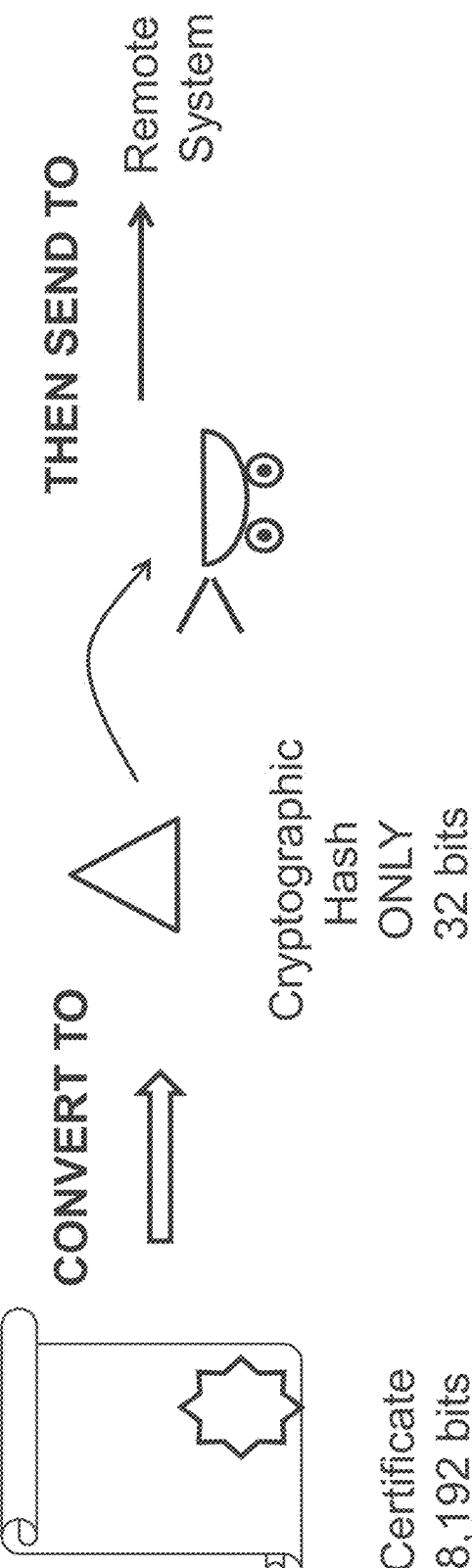
FIG. 9 depicts a solution: converting the certificates, which are original objects, to cryptographic hashes, or statistical objects.
Figure 10:
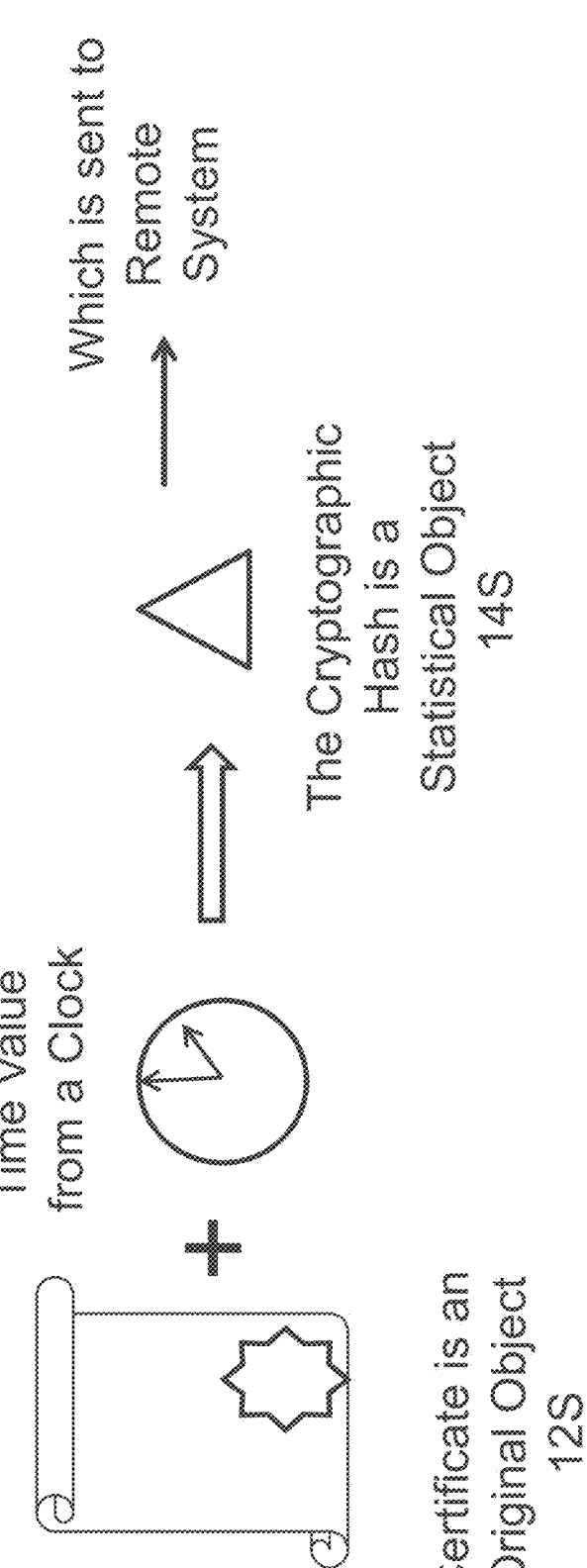
FIG. 10 shows how statistical objects and a time value from a clock are sent to the remote system.
Figure 11:
FIG. 11 illustrates the result of the conversion of three original objects to three statistical objects.
Figure 11:
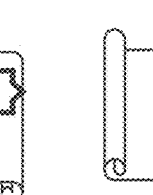
Figure 11:
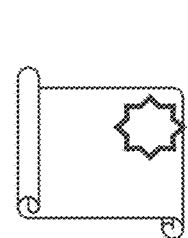

For the foregoing examples, an original object 12S may be an X.509 certificate. An X.509 certificate is used to provide identity and is digitally signed to prove its authenticity. For this example, the X.509 certificates are 1 KB in size (1024 bytes, 8192 bits). It is important to communicate that a specific X.509 certificate is being used to a remote system that has a copy of each X.509 certificate that is expected to be used. In the present example, the system had been designed before there was a requirement to communicate the X.509 certificates, and there is only enough space to communicate 32 bits of information, certainly not enough to send an entire X.509 certificate, which is 256 times larger. But still needing to communicate the X.509 certificate, a cryptographic hash, 32 bits in length, is generated for each X.509 certificate and a common clock. The cryptographic hash is a statistical object 14S generated from an original object 12S. Now let us assume that we have 100 of these X.509 certificates, that is 100 original objects 12S. And let us assume that for each original object 12S, we generate a cryptographic hash of each X.509 certificate and a common clock to produce 100 statistical objects 14S each 32 bits in length. For descriptive purposes, three of these X.509 certificates and their corresponding statistical objects are described in FIG. 6. X.509 certificate #1 identifies Sally and generates a statistical object 14S of value 22443. X.509 certificate #2 identifies Ben and generates a statistical object 14S of value 32415. X.509 certificate #3 identifies Greg. FIG. 7 shows those original objects 12P present on the remote system. FIG. 8 shows that the communications system cannot fit the certificate to communicate it to the remote system. FIG. 9 shows how sending a hash that is much, much smaller than the original certificate can be communicated to the remote system. FIG. 10 shows the generation of the statistical object in greater detail. FIG. 11 shows the statistical object 14S generation from each of the original objects 12S. The statistical object 14S for Greg has a value of 32415. The device 10 has generated the plurality of statistical objects 14P corresponding to the plurality of original objects 12P.

Figure 12:
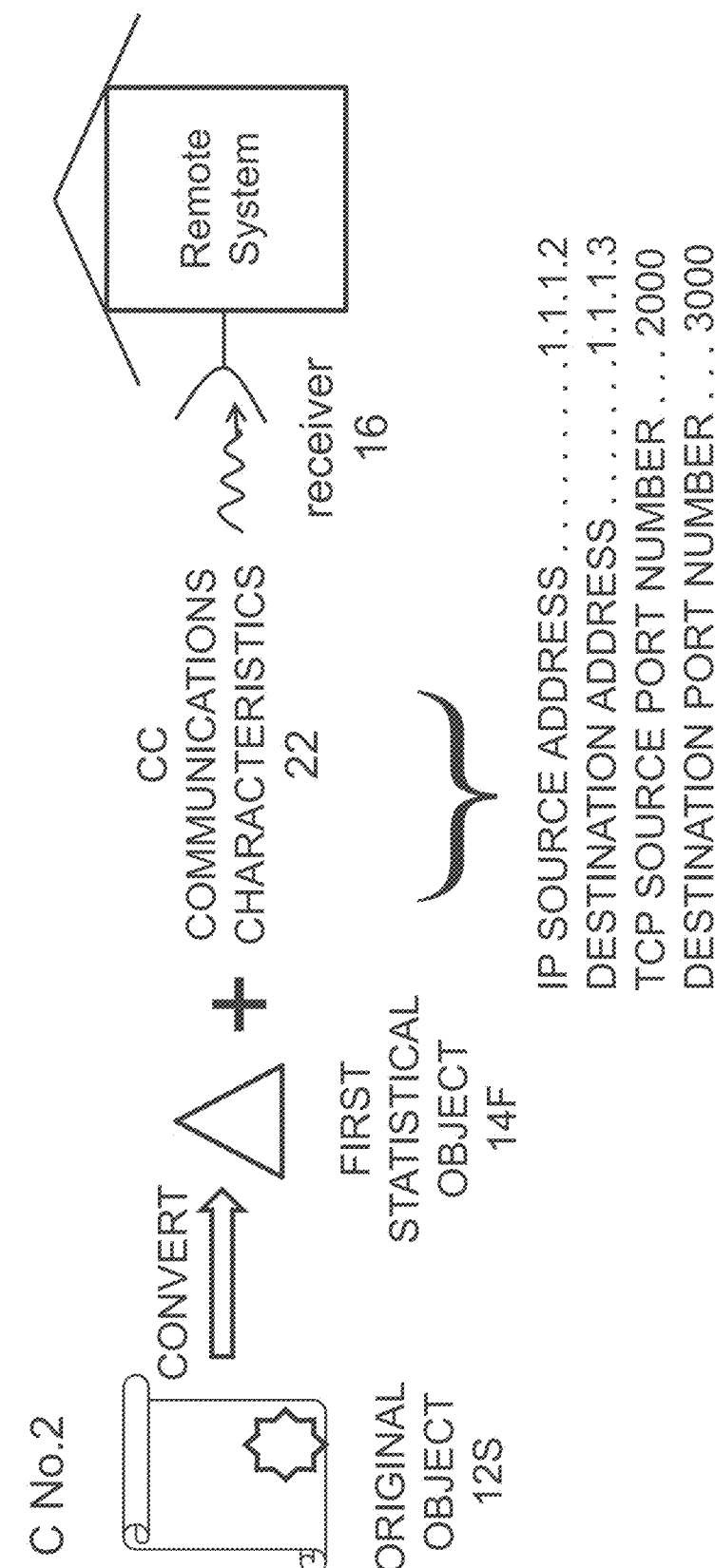
FIG. 12 furnishes a view of Ben's first communication with the remote system.
Figure 13:
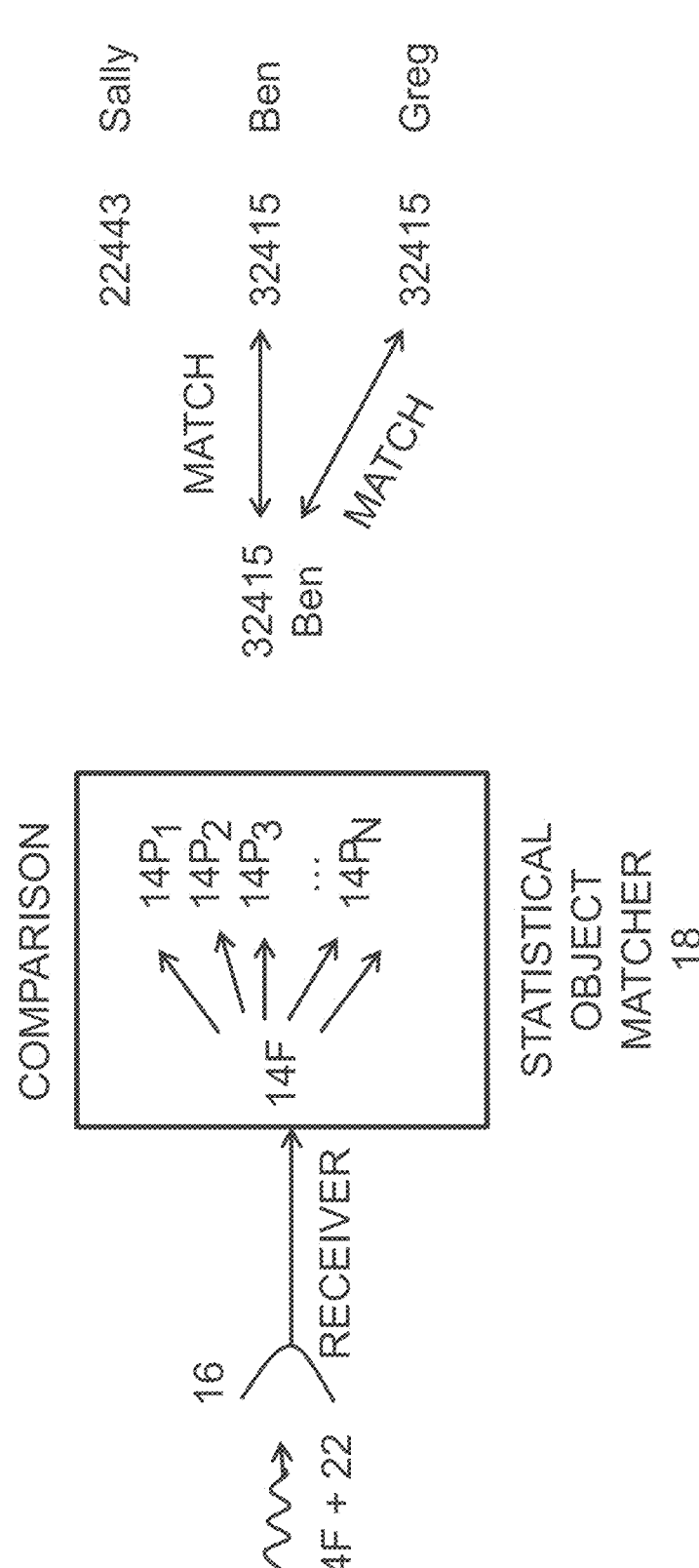
FIG. 13 depicts the comparison process that occurs within a statistical object matcher.
Figure 14:
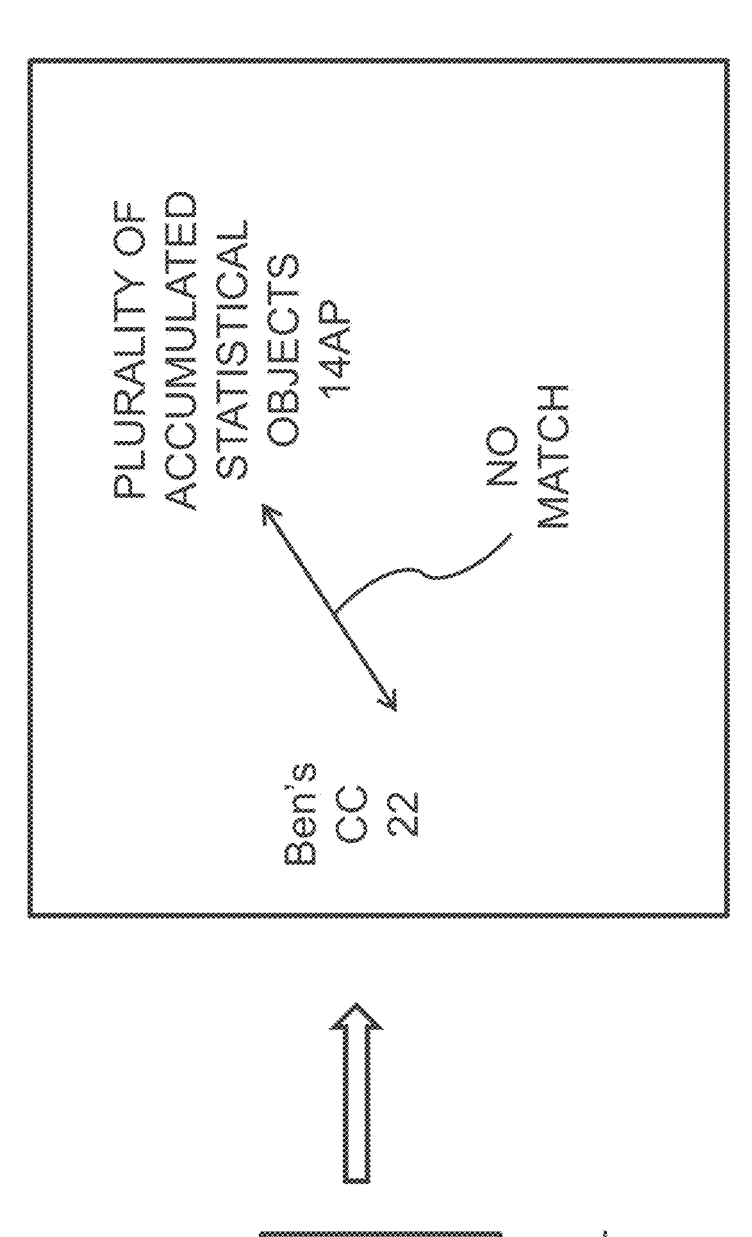
FIG. 14 illustrates the role of an accumulated statistical object selector.
Figure 15:
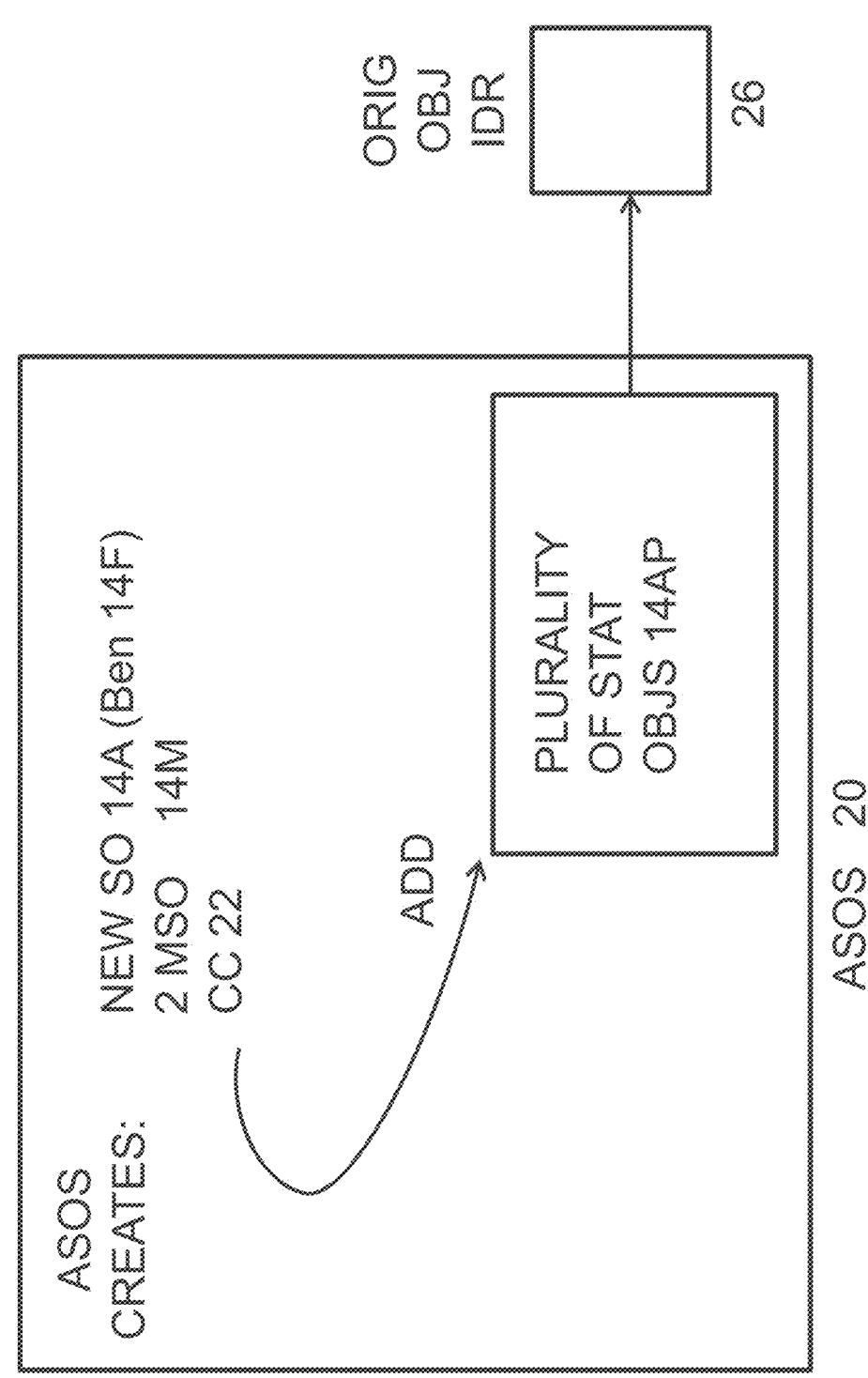
FIG. 15 illustrates the function of an accumulated statistical object selector.
Figure 16:
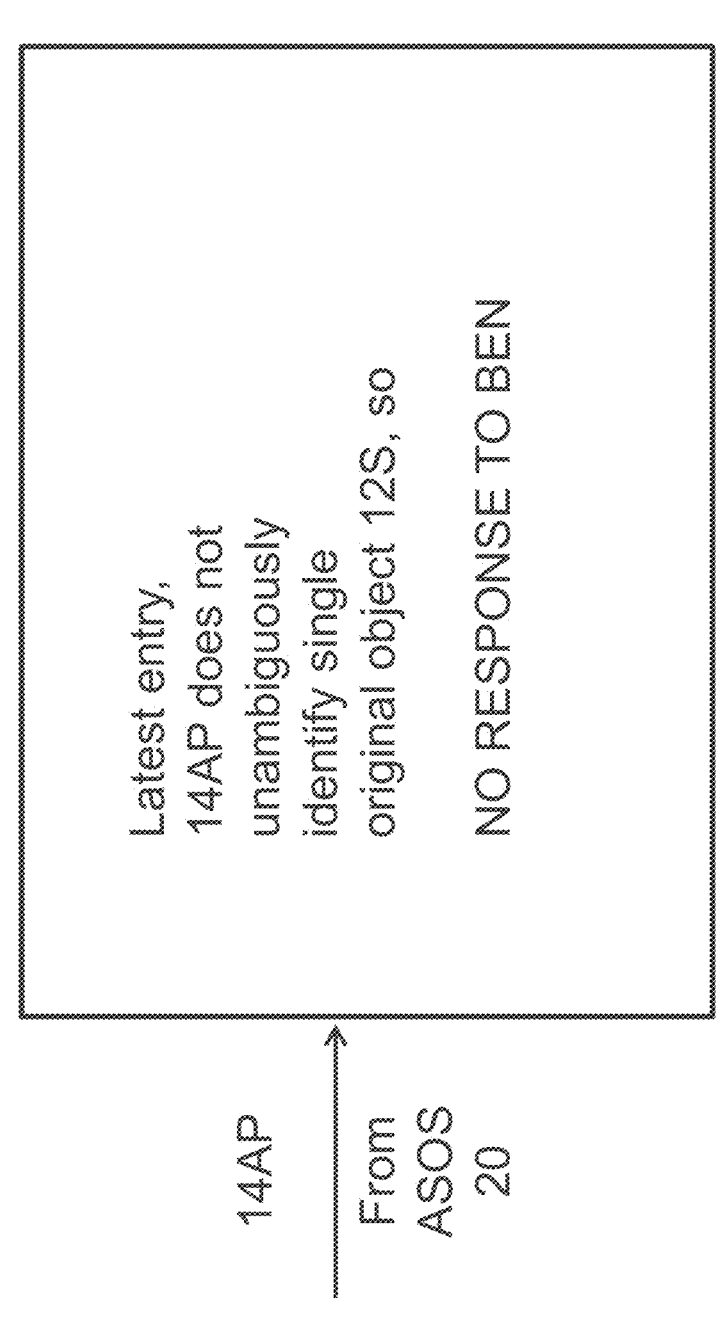
FIG. 16 illustrates the task of an original object identifier.

Now Ben needs to send a communication containing Ben's statistical object to device 10. Device 10 receives Ben's communication using a communications receiver 16. Although we, the narrator, knows that it was Ben that sent the communication to device 10, device 10 does not know this. Ben's communication includes Ben's statistical object (first statistical object 14F) and communications characteristics 22. In this case, the communications occurred over a TCP/IP network and the IP source and destination addresses and the TCP source and destination port numbers are used as communications characteristics 22. The source IP address is 1.1.1.2 and the destination IP address is 1.1.1.3. The source TCP port number is 2000 and the destination TCP port number is 3000. This is shown in FIG. 12. The communications receiver 16 sends the received communications characteristics 22 and Ben's statistical object 14F to the statistical object matcher 18. The statistical object matcher 18 compares Ben's statistical object 14F with the plurality of statistical objects 14P, and determines that there it matches two statistical objects, Ben's, and Greg's. This is shown in FIG. 13. The statistical object matcher 18 sends Ben's statistical object 14F, the two matched statistical objects 14M (Ben's and Greg's) and the communications characteristics 22 to the accumulated statistical object selector 20. If the first statistical object 14F received by the statistical object matcher 18 had not matched any of the plurality of statistical objects 14P, then the statistical object matcher 18 would consider the reception of the first statistical object 14F an attack, and add an attack measurement 13 with the current time in a timestamp 15 to the plurality of attack measurements 13P. The accumulated statistical object selector 20 compares Ben's communications characteristics 22 with the plurality of accumulated statistical objects 14AP and finds no matches. This is shown in FIG. 14. Because no matches were found, the accumulated statistical object selector 20 creates a new accumulated statistical object 14A including Ben's statistical object 14F, the two matched statistical objects 14M and the communications characteristics 22. This is shown in FIG. 15. The new accumulated statistical object 14A is added to the plurality of accumulated statistical objects 14AP. The accumulated statistical object information is set to 32 bits to reflect the information contained in statistical object 14F. The accumulated statistical object 14AP is passed to the original object identifier 26. The original object identifier 26 determines that the accumulated statistical object 14AP does not unambiguously identify a single original object 12S. This is shown in FIG. 16. This concludes the operation of the device 10 for the reception of Ben's statistical object. The device 10 does not respond to Ben's communication because it cannot unambiguously determine who sent the communication.

Figure 17:
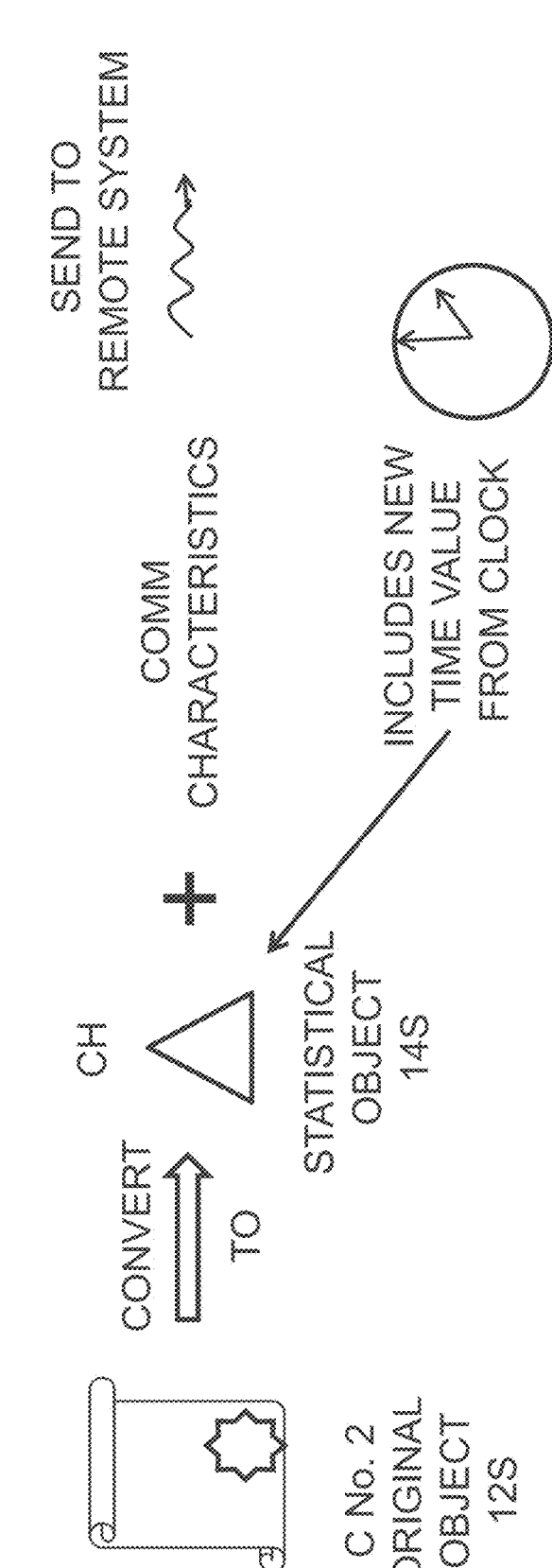
FIG. 17 shows that Ben's first communication has failed to be authenticated.

Now Ben, who sent the original communication did not receive a response, so he sends another communication. This is shown in FIG. 17. Since time has passed since the first communication attempt, the clock value used to generate the statistical objects has changed. The new statistical objects and their corresponding X.509 certificates are: X.509 certificate #1 identifies Sally and generates a statistical object 14S of value 84256. X.509 certificate #2 identifies Ben and generates a statistical object 14S of value 84256. X.509 certificate #3 identifies Greg and generates a statistical object 14S of value 10845. Due to time passing, device 10 regenerates the plurality of statistical objects 14P corresponding to the plurality of original objects 12P which match Sally, Ben, and Greg. This is shown in FIG. 18.

Figure 19:
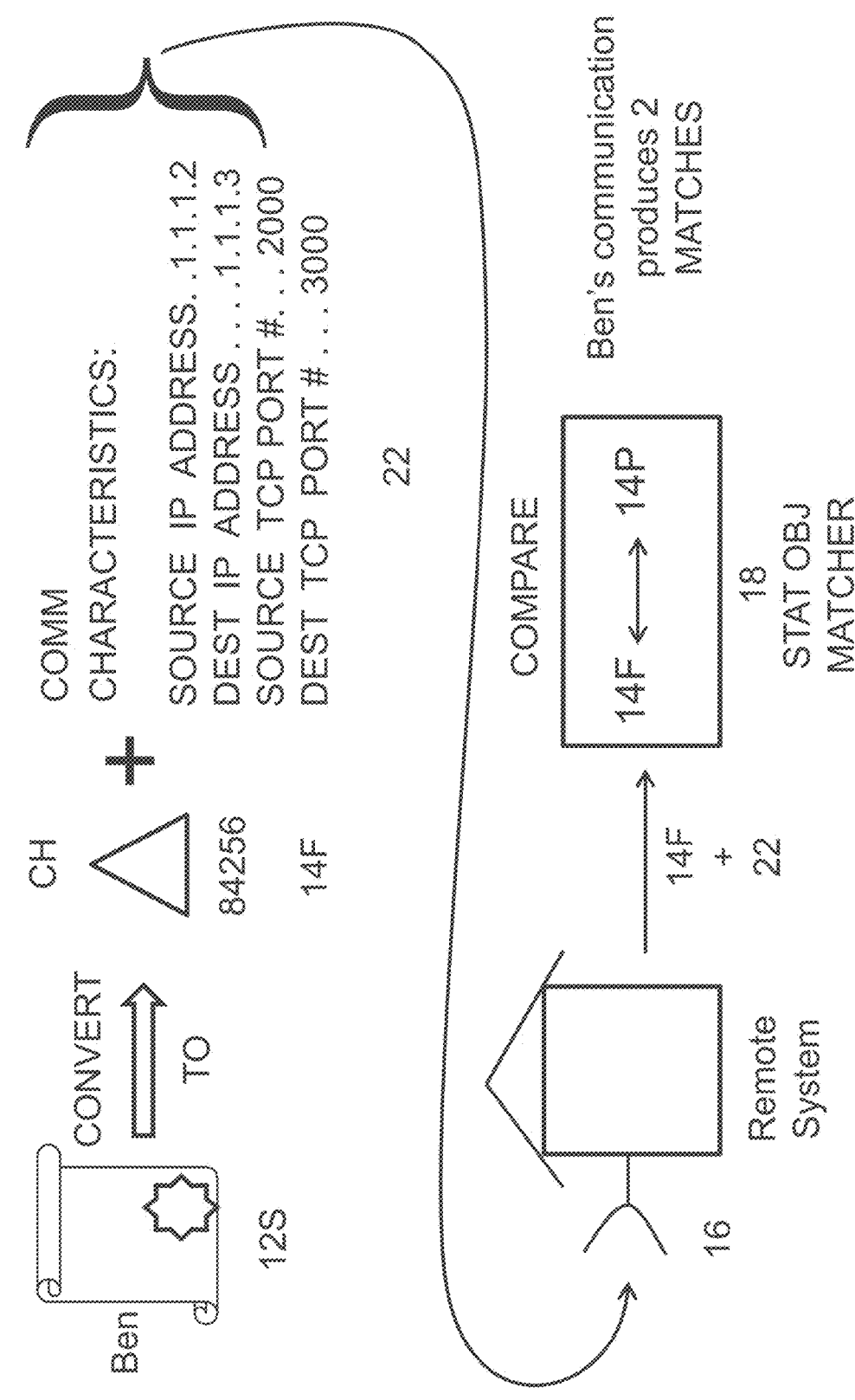
FIG. 19 depicts the second communication, and the resulting match that is produced in the statistical object matcher.
Figure 20:
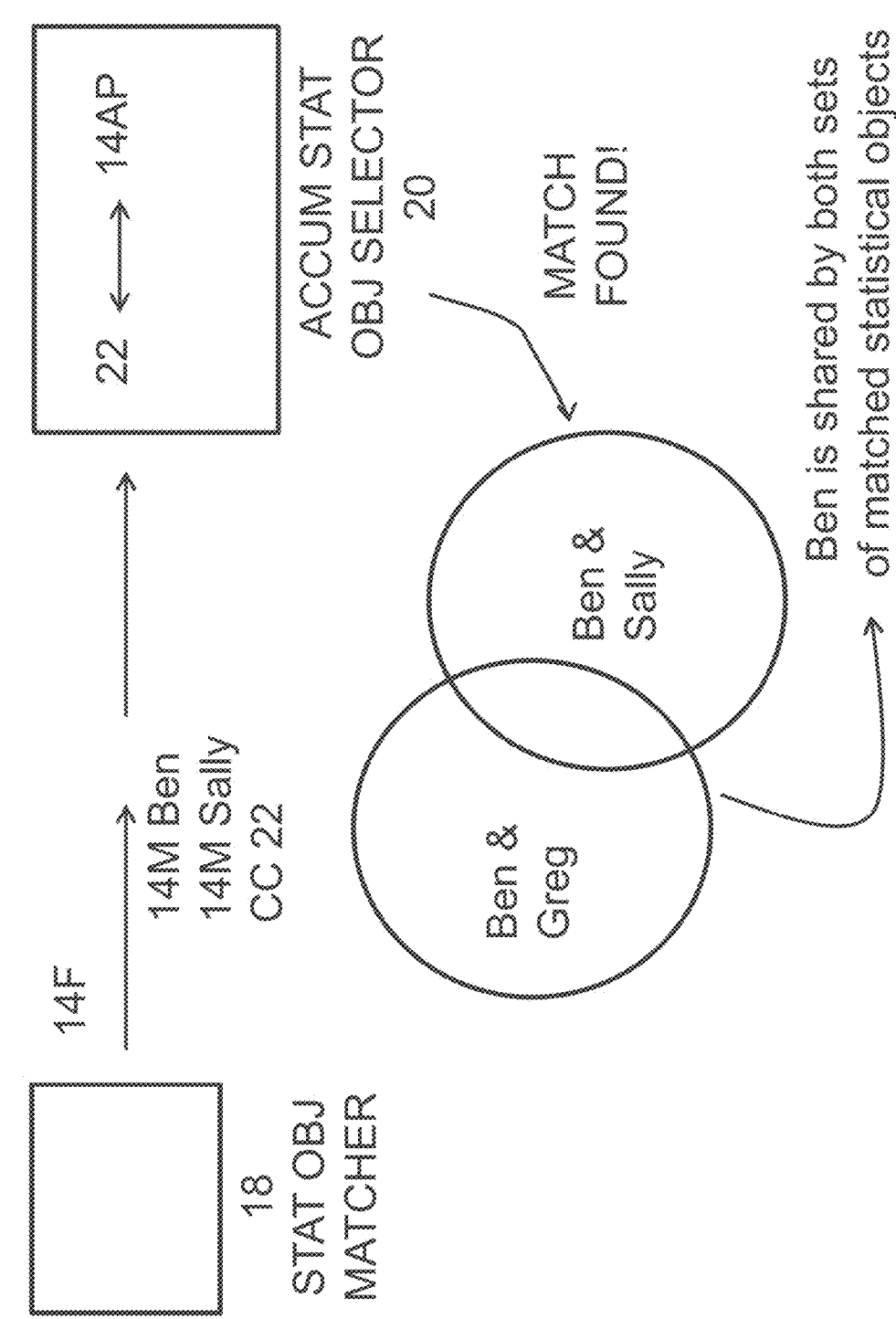
FIG. 20 illustrates the process of finding a match.
Figure 21:
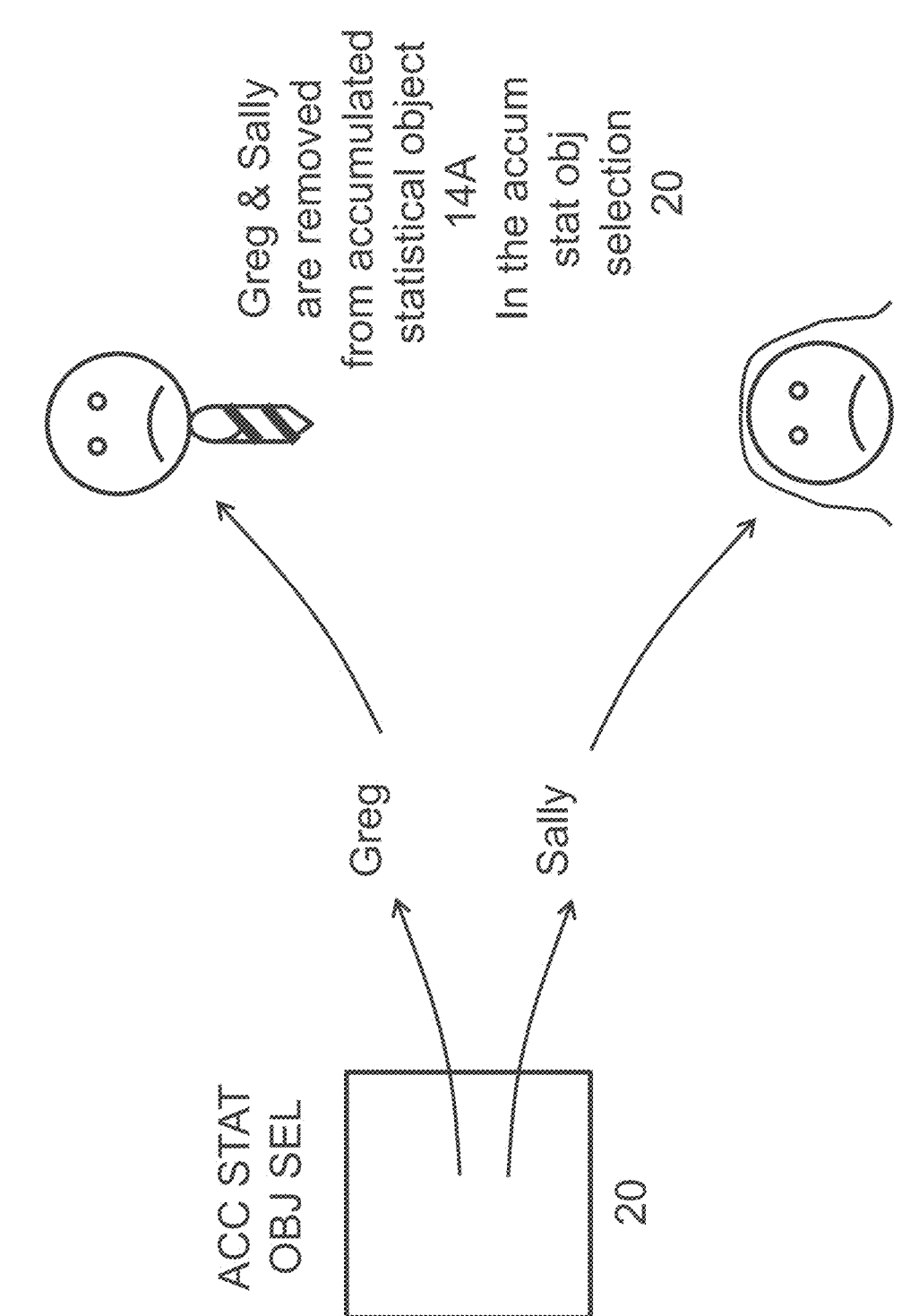
FIG. 21 shows how the accumulated statistical object selector discards statistical objects that do not lead to an authenticating match.

Now Ben sends a second communication containing Ben's current statistical object to device 10. Device 10 receives Ben's communication using a communications receiver 16. Ben's communication includes Ben's statistical object 14F and communications characteristics 22. Again, the communications characteristic 22 is source IP address of 1.1.1.2, destination IP address of 1.1.1.3, source TCP port number of 2000 and destination TCP port number of 3000. This is shown in FIG. 19. The communications receiver 16 sends the received communications characteristics 22 and Ben's statistical object 14F to the statistical object matcher 18. The statistical object matcher 18 compares Ben's statistical object 14F with the plurality of statistical objects 14P and determines that there it matches two statistical objects, Ben's, and Sally's. The statistical object matcher 18 sends Ben's statistical object 14F, the two matched statistical objects 14M (Ben's and Sally's) and the communications characteristics 22 to the accumulated statistical object selector 20. The accumulated statistical object selector 20 compares Ben's communications characteristics 22 with the plurality of accumulated statistical objects 14AP and finds a match with Ben's previous communication. The matched accumulated statistical object 14A includes the previous matched statistical object 14M containing Ben and Greg and is compared against the two matched statistical objects 14M matching Ben's statistical object 14F containing Ben and Sally. The intersection of both matched statistical sets is Ben. This is shown in FIG. 20. Greg and Sally are removed from the accumulated statistical object 14A as shown in FIG. 21. The accumulated statistical object information increases from 32 bits to 64 bits with the addition of statistical object 14F. The accumulated statistical object 14A is passed to the original object identifier 26. The original object identifier 26 takes the given accumulated statistical object 14A and determines if the accumulated statistical information within the accumulated statistical object could only be generated by a single, unique original object 12S. Original object 12S is Ben's X.509 certificate. Original object 12S is now indicated as selected original object 12SEL and is passed to the probability calculator 30. This is shown in FIG. 22. The probability calculator 30 takes the given accumulated statistical object 14A, and, based on the number of bits of statistical object information that has been accumulated in the accumulated statistical object 14A, the number of statistical objects in the plurality of statistical objects 14P, and the accumulated attack measurement 13A. calculates a probability of guessing the accumulated statistical object 14A information. The accumulated attack measurement 13A is the sum of the plurality of attack measurements 13P.

Figure 24:
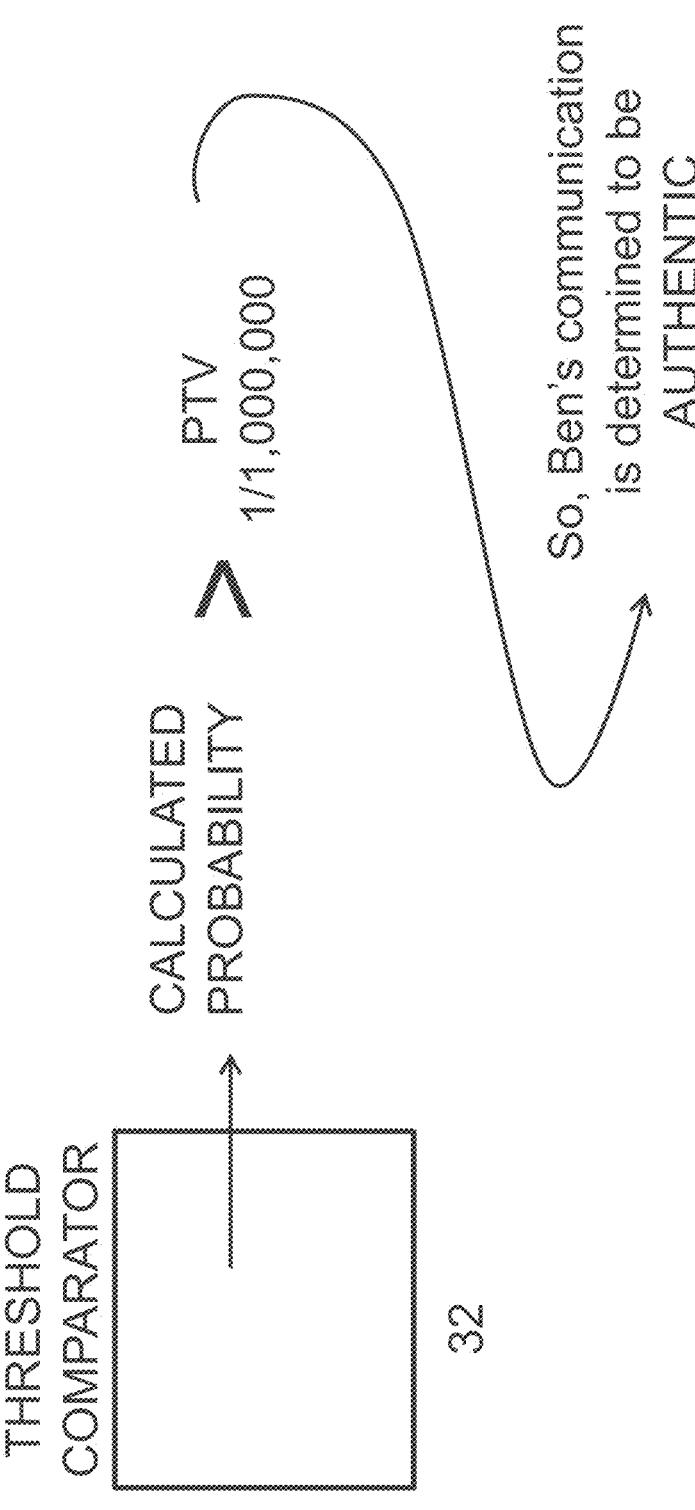
FIG. 24 exhibits the final result, the authentication of Ben's second communication.

In this example, there are 60 statistical objects 14S, an accumulated attack measurement 13A of 40 and the device 10 has received 64 bits of statistical object information (32 bits×2). The number of statistical objects 14S and the accumulated attack measurement 13A are added together, resulting in 100. The probability of guessing is calculated by using the formula: $p(n;d) \approx 1 - e^{-n^2/(2 \times d)}$ where n is the number of statistical objects in the table of valid statistical objects; d is the total number of unique statistical objects available; and d is $d = 2^b$ where b is the number of bits of statistical object information received. Therefore: $d = 2^{64}$, $n = 100$ resulting in $p(100, 2^{64}) \approx 1 - e^{-100^2/(2 \times 2^{64})}$, $p(100, 2^{64}) \approx 0.\backslash u\ 6$ In this case, with only a few original objects (60), relatively few attacks (4), and a relatively large amount of accumulated statistical object information, the probability of guessing those 64 bits of accumulated statistical object information is vanishingly small, approaching zero. This calculated probability 36 and the accumulated statistical object 22 are passed to the threshold comparator 32. The threshold comparator 32 takes the calculated probability 36 and compares it with the probability threshold value 27. In our example, the probability threshold value 27 is 1 in a million. The threshold comparator 32 determines that our calculated probability 27 of zero is less than the probability threshold value of 1 in a million. This is shown in FIG. 23. Having not exceeded our probability threshold value 27, the threshold comparator 32 makes an indication 30 that includes the selected original object 12SEL Ben. This indication 30 communicates to other functions within the device 10 that the communication was send by Ben and has not exceeded the probability threshold value 27, and that the device 10 should now respond to Ben's communication. This is shown in FIG. 24.

In a second example, we continue with the first example but change the number of statistical objects 14S from 60 to 99,000,000 (ninety nine million), and the number of accumulated attack measurement 13A to 1,000,00 (one million) for a total of 100,000,000 (one hundred million) used in the probability calculation. The calculated probability 36 of guessing the accumulated statistical object 14A with 64 bits of information is 2.674%, greater than the probability threshold value of 1 in a million. Since this is greater than the threshold, this concludes the operation of the device 10 for the reception of Ben's statistical object. The device 10 does not respond to Ben's communication because it has exceeded the probability threshold value 27. Now Ben, who sent the original communications again did not receive a response, so he sends another communication. Device 10 receives Ben's communication using a communications receiver 16. Ben's communication includes Ben's statistical object 14F and communications characteristics 22. Again, the communications characteristic 22 is source IP address of 1.1.1.2, destination IP address of 1.1.1.3, source TCP port number of 2000 and destination TCP port number of 3000. The communications receiver 16 sends the received communications characteristics 22 and Ben's statistical object 14F to the statistical object matcher 18. The statistical object matcher 18 compares Ben's statistical object 14F with the plurality of statistical objects 14P and determines that there it matches only a single statistical object, Ben's. The statistical object matcher 18 sends Ben's statistical object 14F, the matched statistical object 14M (Ben's) and the communications characteristics 22 to the accumulated statistical object selector 20. The accumulated statistical object selector 20 compares Ben's communications characteristics 22 with the plurality of accumulated statistical objects 14AP and finds a match with Ben's previous communication. The matched accumulated statistical object 14A includes the previous matched statistical object 14M containing only Ben and is compared against the matched statistical object 14M matching Ben's statistical object 14F containing Ben. The intersection of both matched statistical sets is Ben. The accumulated statistical object information increases from 64 bits to 96 bits with the addition of statistical object 14F. The accumulated statistical object 14A is passed to the original object identifier 26. The original object identifier 26 takes the given accumulated statistical object 14A and determines if the accumulated statistical information within the accumulated statistical object could only be generated by a single, unique original object 12S. Original object 12S is Ben's X.509 certificate. Original object 12S is now indicated as selected original object 12SEL and is passed to the probability calculator 30. The probability calculator 30 takes the given accumulated statistical object 22, and, based on the number of bits of statistical object information that has been accumulated in the accumulated statistical object 22 and the number of statistical objects in the plurality of statistical objects 14P, calculates the probability of guessing the accumulated statistical object information. In a second example, we continue with the first example but change the number of original objects 12S from 60 to 99,000,000 (ninety million) and the number of accumulated attack measurement 13A to 1,000,000 (one million) for a total of 100,000,000 (one hundred million) used in this example probability calculation. The calculated probability 36 of guessing the accumulated statistical object 14A with 96 bits of information is again vanishingly small, approaching zero. This calculated probability 36 and the accumulated statistical object 22 are passed to the threshold comparator 32. The threshold comparator 32 takes the calculated probability 36 and compares it with the probability threshold value 27. The threshold comparator 32 determines that our calculated probability 27 of 0 is less than the probability threshold value of 1 in a million. Having not exceeded our probability threshold value 27, the threshold comparator 32 makes an indication 30 that includes the selected original object 12SEL Ben. This indication 30 communicates to other functions within the device 10 that the communication was send by Ben and has not exceeded the probability threshold value 27 and that the device 10 should now respond to Ben's communication. This shows how Ben can communicate, even while the system is under attack, without resorting to blocking communication from devices with communications characteristics 22 in common with the attacks.

In a third example may continue from the second example and add an association of the selected original object 12SEL (Ben) and the communications characteristics 22. This allows for the optimization of subsequence communication requests from Ben.

Continuing with the third example, Ben makes another communication to device 10 during which within device 10 an association exists between Ben's original object and the communications characteristics 22 of Ben's previous communication. Device 10 receives Ben's communication using a communications receiver 16. Ben's communication includes Ben's statistical object (first statistical object 14F) and communications characteristics 22. This time, the communications characteristics 22 is source IP address of 1.1.1.2, destination IP address of 1.1.1.3, source TCP port number of 5000 and destination TCP port number of 7000. The source IP address is the same source IP address that was used in the prior, accepted communications. The statistical object matcher 18 compares Ben's statistical object 14F with the plurality of statistical objects 14P, and determines that there it matches two statistical objects, Ben's, and Greg's. The statistical object matcher 18 sends Ben's statistical object 14F, the two matched statistical objects 14M (Ben's and Greg's) and the communications characteristics 22 to the accumulated statistical object selector 20 and sends the communications characteristics 22 to the associated original object selector 24. The accumulated statistical object selector 20 compares Ben's communications characteristics 22 with the plurality of accumulated statistical objects 14AP and finds no matches. Because no matches were found, the accumulated statistical object selector 20 creates a new accumulated statistical object 14A including Ben's statistical object 14F, the two matched statistical objects 14M and the communications characteristics 22. The new accumulated statistical object 14A is added to the plurality of accumulated statistical objects 14AP. The accumulated statistical object information is set to 32 bits to reflect the information contained in statistical object 14F. The accumulated statistical object selector 20 sends the accumulated statistical object 14A to the original object identifier 26.

The original object identifier 26 receives the communications characteristics 22 and compares them with the communications characteristics 22 associated with the plurality of original objects 12P. Because an association exists between Ben's original object and Ben's communications characteristics 22, the associated original object selector 24 selects Ben's original object, indicated as 12SEL and passes the selected original object 12SEL to the associated original object identifier 28.

The original object identifier 26 takes the accumulated statistical object 14A and the selected original object 12SEL (Ben) and ensures that the accumulated statistical object 14A could have been generated from the selected original object 12SEL. Upon determining that the accumulated statistical object 14A was producible by the selected original object 12SEL, the intersection of the original objects 14 is calculated using the original objects associated with the matched statistical objects 14M (Ben and Greg) and the selected original object 12SEL (Ben) resulting in Ben. This intersection is indicated in the accumulated statistical object 14A. Since there is exactly one original object now contained in the accumulated statistical object 14A, the accumulated statistical object 14A is sent to the probability calculator 30.

The probability calculator 30 takes the given accumulated statistical object 14A. and, based on the number of bits of statistical object information that has been accumulated in the accumulated statistical object 14A and the number of statistical objects in the plurality of statistical objects 14P, calculates the probability of guessing the accumulated statistical object information.

In this example, there are 100,000,000 statistical objects and have received 32 bits of statistical object information, but there is only a single statistical object that is associated with the Ben's communications characteristics 22. Therefore, instead of using 100,000,000 as the number of statistical objects, the number of statistical objects is 1, resulting in a calculated probability 36 of $p=\frac{1}{2}^{34}$. This calculated probability 36 and the accumulated statistical object 22 are passed to the threshold comparator 32. The threshold comparator 32 takes the calculated probability 36 and compares it with the probability threshold value 27. The threshold comparator 32 determines that our calculated probability 27 of $p=\frac{1}{2}^{32}$ is less than the probability threshold value of 1 in a million. Having not exceeded the probability threshold value 27, the threshold comparator 32 makes an indication 34 that includes the selected original object 12SEL (Ben). This indication 34 communicates to other functions within the device 10 that the communication was sent by Ben and has exceeded the probability threshold value 27 and that the device 10 should now respond to Ben's communication. It should be noted that in this third example, because the communications characteristics 22 associated with the original object 12S are used, it is possible to arrive at a selected original object 12SEL and not exceed the probability threshold value 27 while receiving fewer bits of information from the received (first) statistical object 14F. \d 6

VII. System Architecture

FIG. 25 is an illustration which shows an embodiment of a system according to the present disclosure, which includes an integrated SOI system 51. The integrated SOI system 51 receives messages through network interfaces 67. In this embodiment, one of the network interfaces 67 is connected to a network 64 and the other network interface 67 is connected to a network resource 62. All traffic that is communicated between the network interfaces 67 traverses the SOI policy service 40. The SOI policy service 40 is aided by an SOI resolution service 46. The SOI resolution service 46 is aided by a bootstrap keying service 44, a clock 47 and an object activation service 50. The SOI policy service 40 also has access to a dynamic blacklist table 56 and a policy table 59. Alternate embodiments of an integrated SOI system 51 may choose not to include a bootstrap keying service 44, or an object activation service 50.

Figure 26:
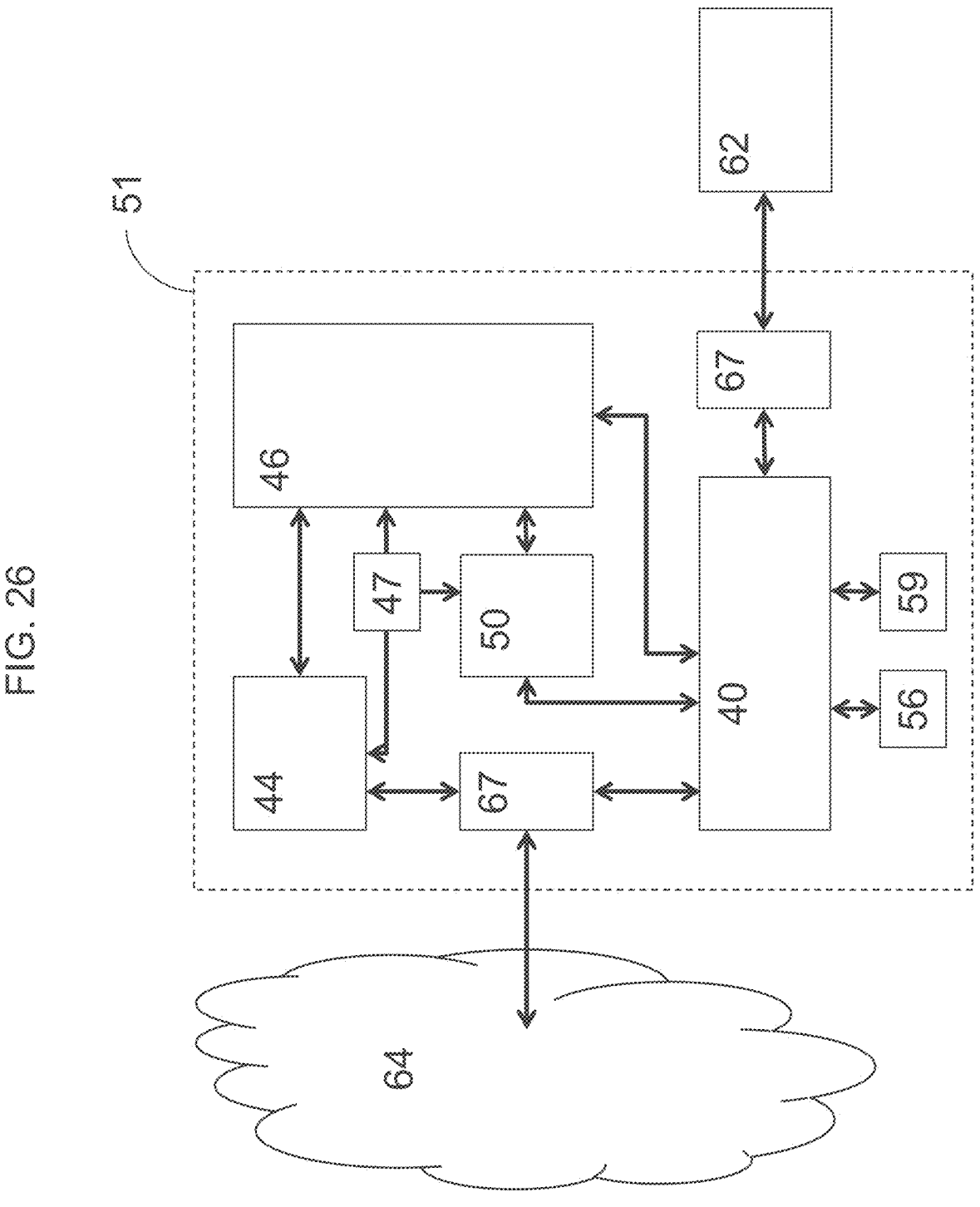
FIG. 26 is an illustration which shows an alternate embodiment of the present disclosure, an integrated SOI system.

FIG. 26 is an illustration which shows an alternate embodiment of the present disclosure, which includes an integrated SOI system 51. In this alternate embodiment, the SOI policy service 40 is also aided by an object activation service 50.

Figure 27:
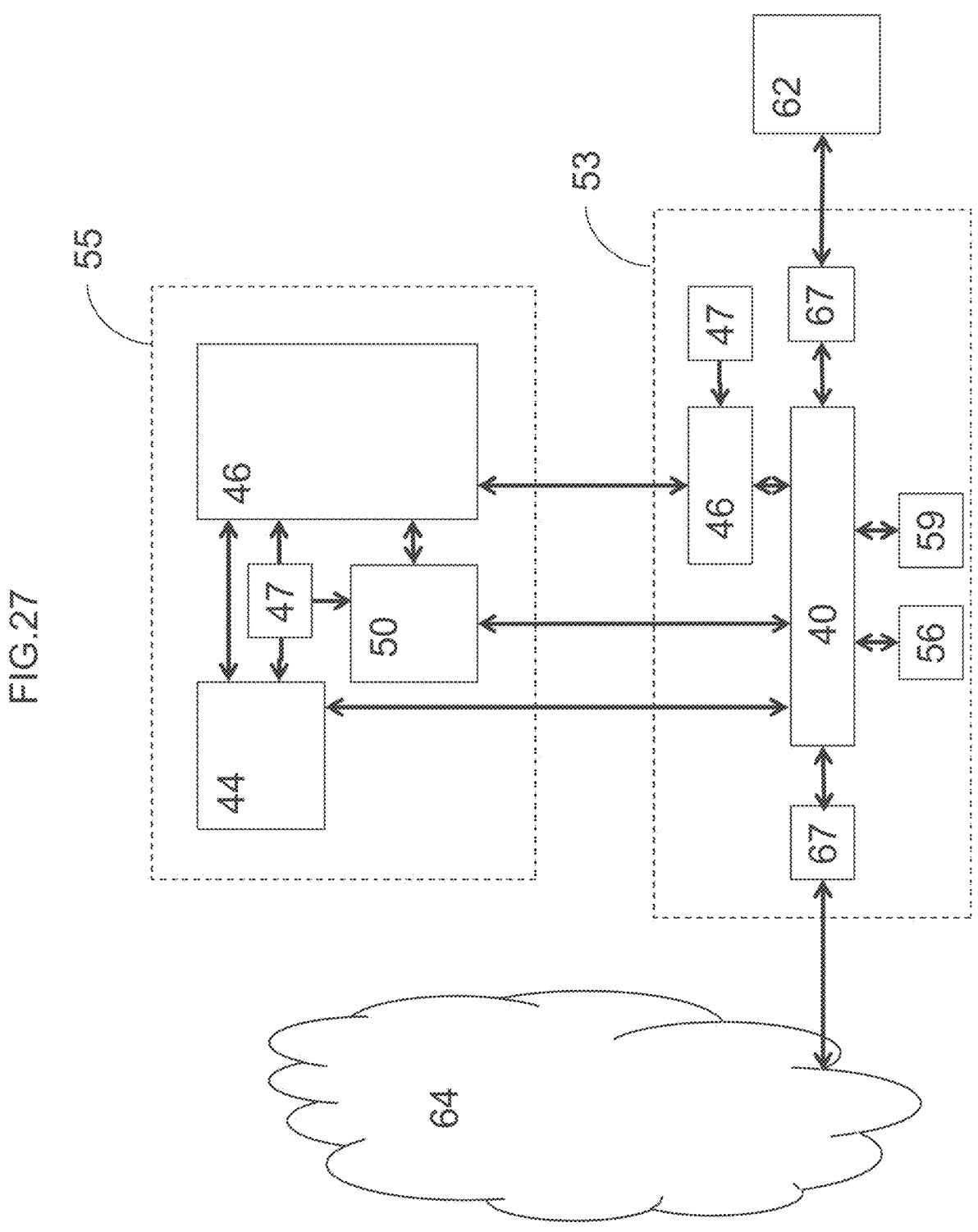
FIG. 27 is an illustration which shows an alternate embodiment of the present disclosure, an integrated SOI policy system and integrated SOI services.

FIG. 27 is an illustration which shows an alternate embodiment of the present disclosure, a system of an integrated SOI policy system 53 and integrated SOI services 55. The integrated SOI policy system 53 receives messages through two network interfaces 67. In this embodiment, one of the network interfaces 67 is connected to a network 64 and the other network interface 67 is connected to a network resource 62. All traffic that is communicated between the network interfaces 67 traverses the SOI policy service 40. The SOI policy service 40 is aided by an SOI resolution service 46, which is in turn aided by a local clock 47. The SOI policy service 40 is also aided by integrated SOI services 55. The integrated SOI services 55 is composed of a bootstrap keying service 44, an SOI resolution service 46, a clock 47 and an object activation service 50. The SOI policy service 40 also has access to a dynamic blacklist table 56 and a policy table 59. Alternate embodiments of integrated SOI services 55 may choose not to include a bootstrap keying service 44, or an object activation service 50.

Figure 28:
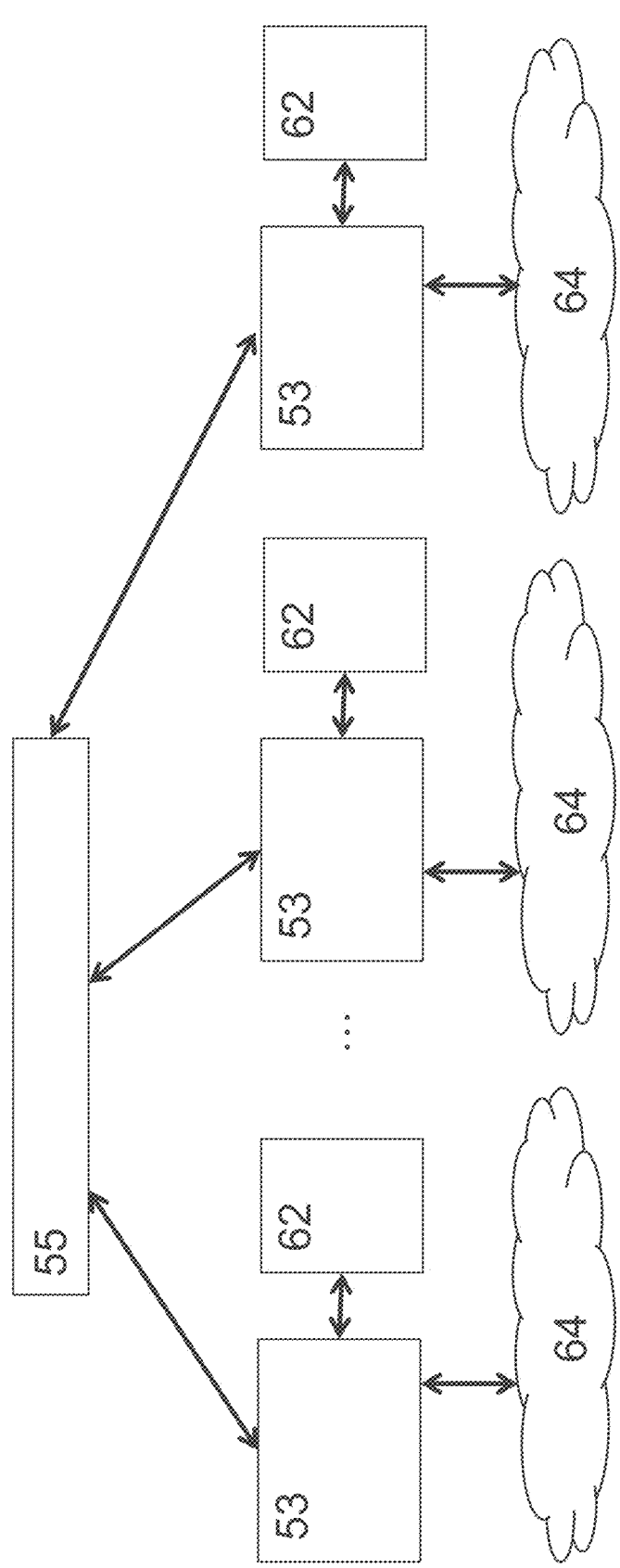
FIG. 28 is an illustration which shows an alternate embodiment of the present disclosure with a simple hierarchy.

FIG. 28 is an illustration which shows an alternate embodiment of the present disclosure, a system of multiple instances of an integrated SOI policy system 53 and a single instance of integrated SOI services 55.

Figure 29:
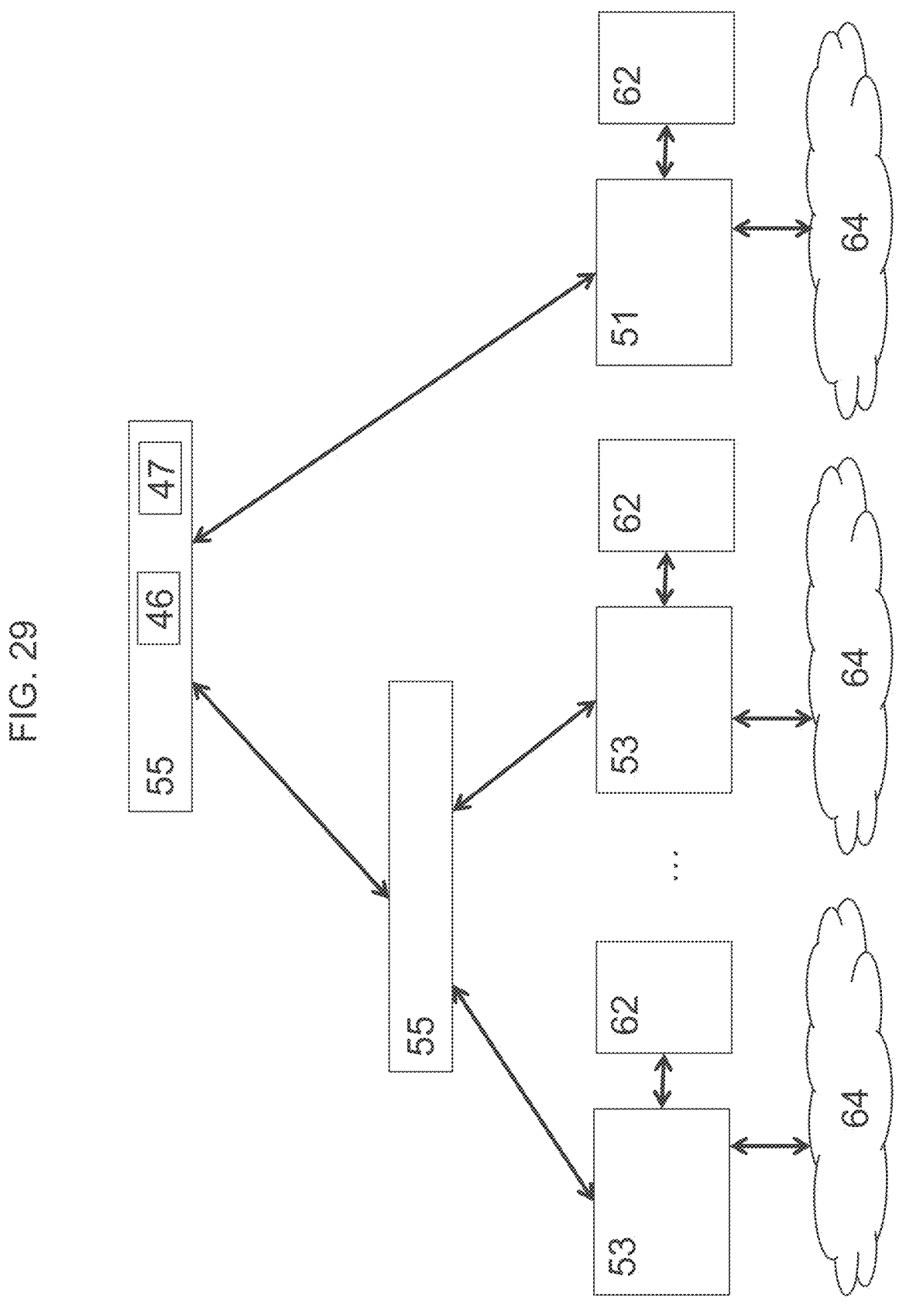
FIG. 29 is an illustration which shows an alternate embodiment of the present disclosure with a more complex hierarchy.

FIG. 29 is an illustration which shows an alternate embodiment of the present disclosure, a system of multiple instances of an integrated SOI policy system 53 and multiple instances of integrated SOI services 55. In this embodiment, the top level instance of integrated SOI services 55 does not include a bootstrap keying service 44, or an object activation service 50. The top level instance of integrated SOI services 55 includes an SOI resolution service 46 and a clock 47.

Figure 30:
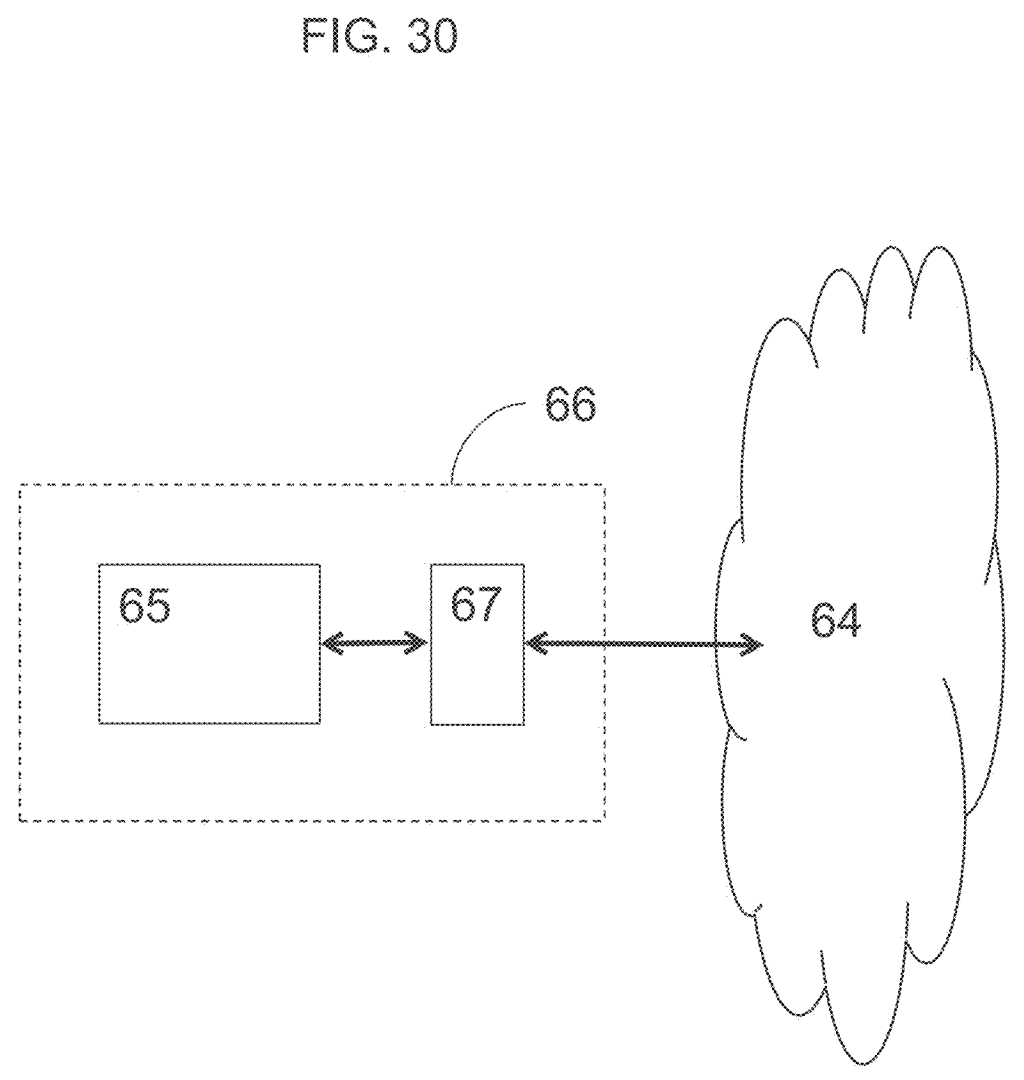

FIG. 30 is an illustration which shows a network client 66 connected to a network 64. A network client 66 includes a computer application 65 that communicates through a network interface 67 to the network 64.

Figure 31:
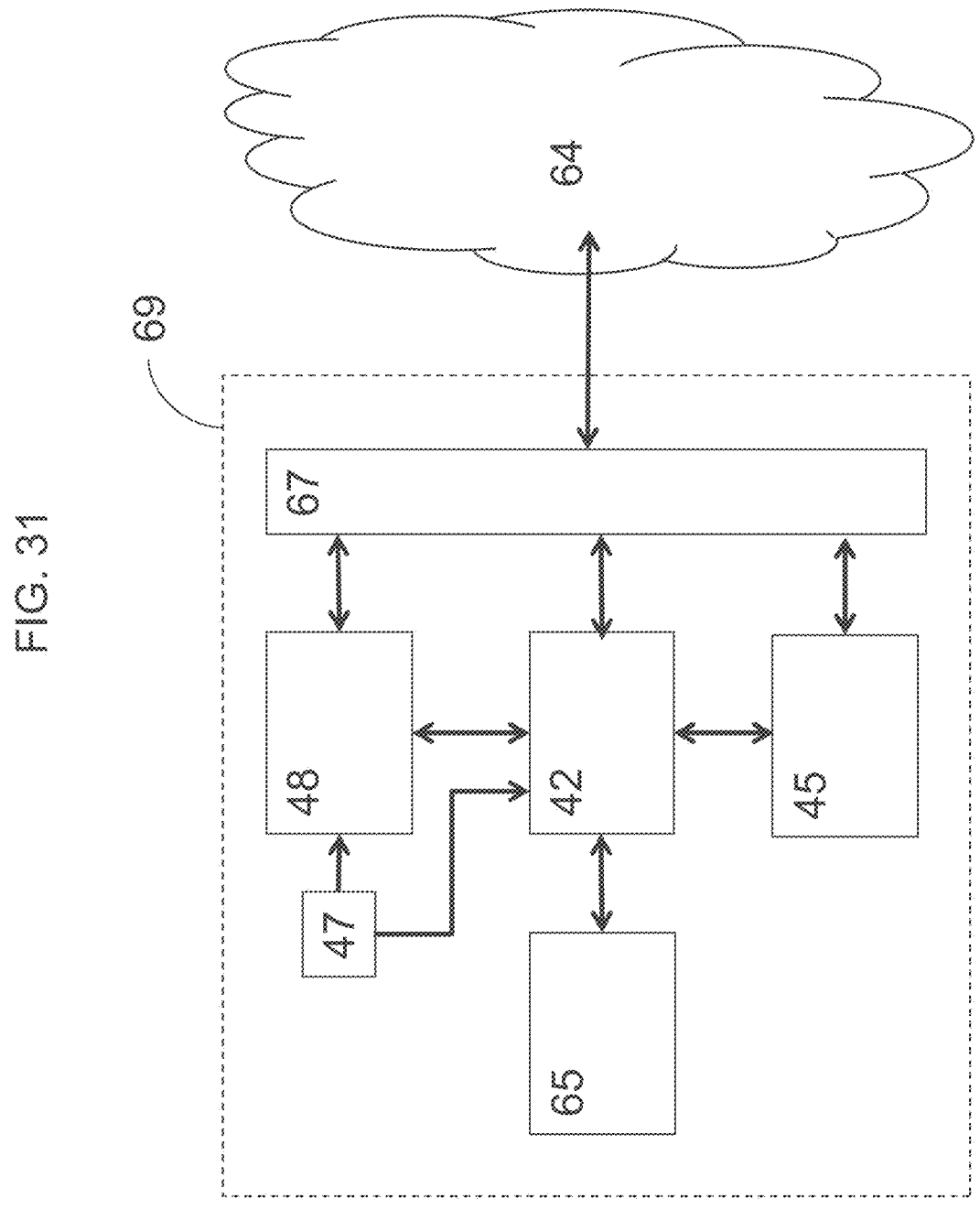
FIG. 31 is an illustration which shows an embodiment of the present disclosure, a network SOI client.

FIG. 31 is an illustration which shows one particular embodiment of the present disclosure, which includes an SOI network client 69. The SOI network client 69 receives messages through a network interface 67 and from a computer application 65. All traffic that is communicated between the computer application 65 and the network interfaces 67 traverses the SOI insertion policy service 42. The SOI insertion policy service 42 is aided by a bootstrap keying agent 45, a clock 47 and an object activation agent 48. Alternate embodiments of an SOI network client 69 may choose not to include a bootstrap keying agent 45, or an object activation agent 48.

Figure 32:
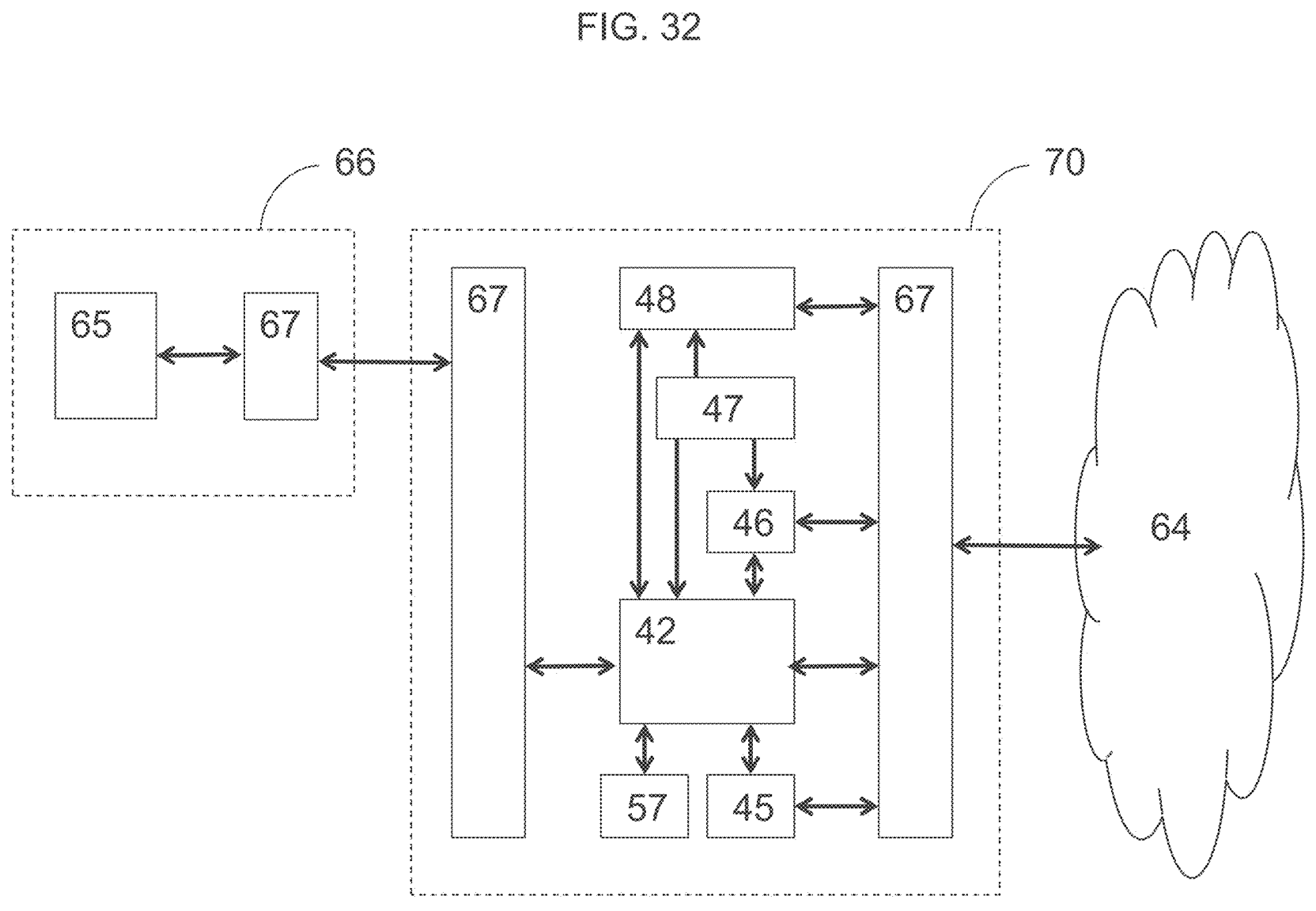

FIG. 32 is an illustration which shows an alternate embodiment of the present disclosure; a system of a network client 66 and an SOI insertion device 70. The SOI insertion device 70 receives messages from two network interfaces 67. In this embodiment, one of the network interfaces 67 is connected to a network 64 and the other network interface 67 is connected to a network client 66. All traffic that is communicated between the network interfaces 67 traverses the SOI insertion policy service 42. The SOI policy insertion service 42 is aided by a bootstrap keying agent 45, an SOI resolution service 46, a clock 47 and an object activation agent 48. The SOI policy insertion service 42 also has access to an insertion object table 57. Alternate embodiments of an SOI network client 69 may choose not to include a bootstrap keying agent 45, an SOI resolution service 46 or an object activation agent 48.

Figure 33:
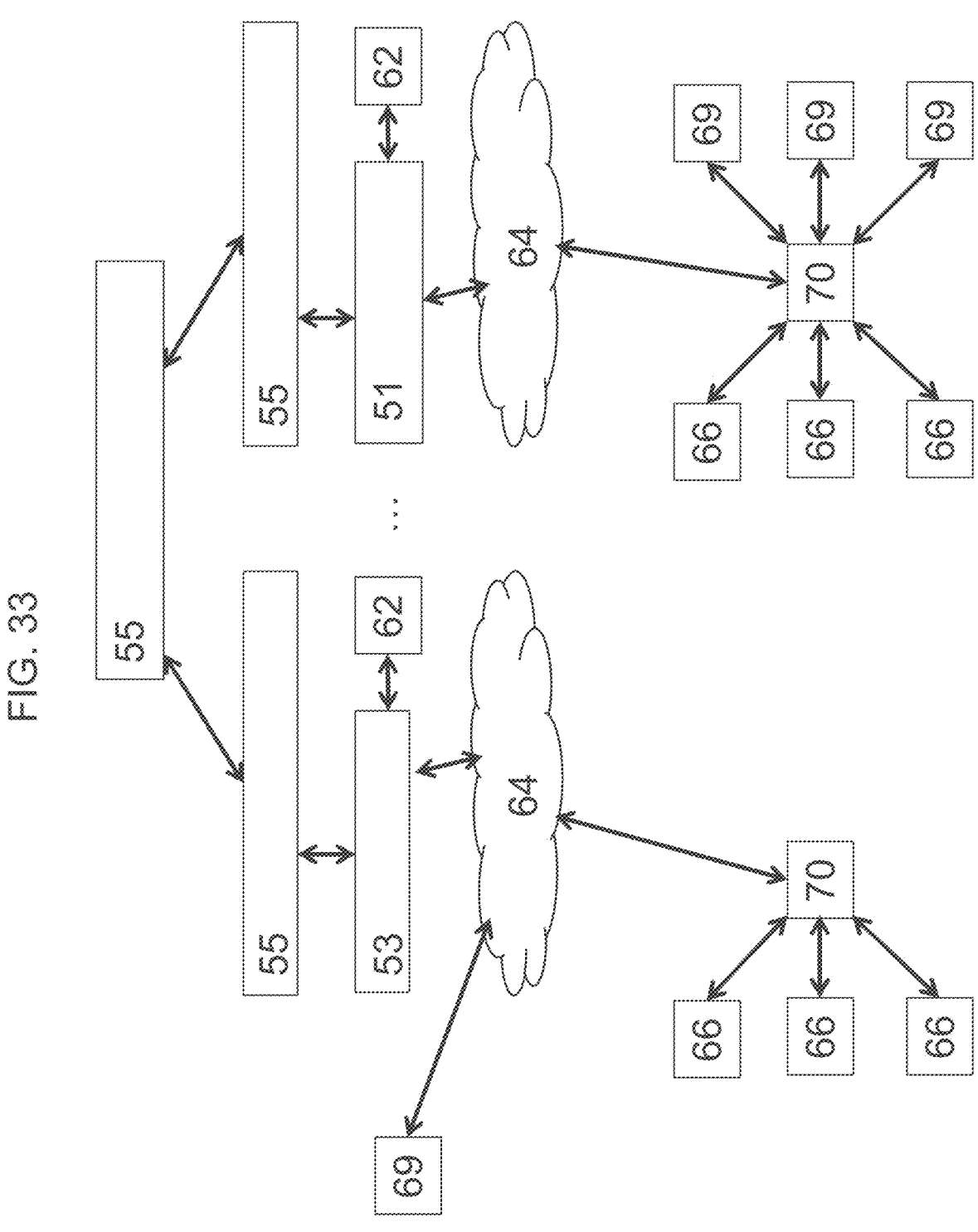
FIG. 33 is an illustration which shows a system of SOI devices.

FIG. 33 is an illustration of an embodiment of an SOI system. An SOI network client 69 is connected to a network 64. Other SOI network clients 69 are connected through a SOI insertion device 70. A series of network client 66 are connected to SOI insertion devices 70. The networks 64 are connected to a series of integrated SOI systems 51 and integrated SOI policy systems 53. The integrated SOI systems 51 and the integrated SOI policy systems are connected to a series of integrated SOI policy services 55.

Figure 34:
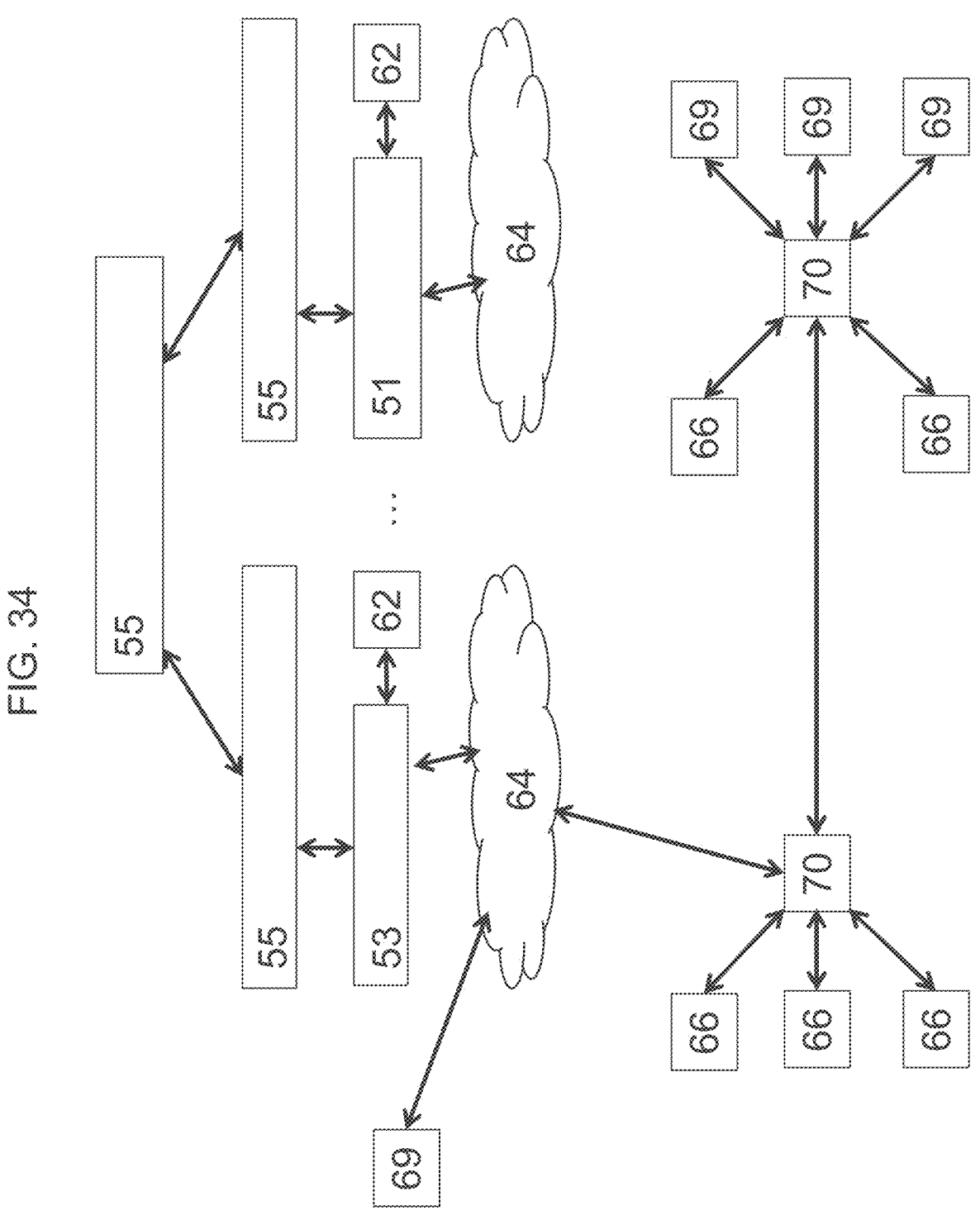
FIG. 34 is an illustration which shows an alternate system of SOI devices.

FIG. 34 is an illustration of an alternate embodiment of an SOI system. An SOI network client 69 is connected to a network 64. Other SOI network clients 69 are connected through a SOI insertion device 70. A SOI insertion device 70 is connected to a second SOI insertion device 70. A series of network client 66 are connected to SOI insertion devices 70. The networks 64 are connected to a series of integrated SOI systems 51 and integrated SOI policy systems 53. The integrated SOI systems 51 and the integrated SOI policy systems are connected to a series of integrated SOI policy services 55.

Figure 35:
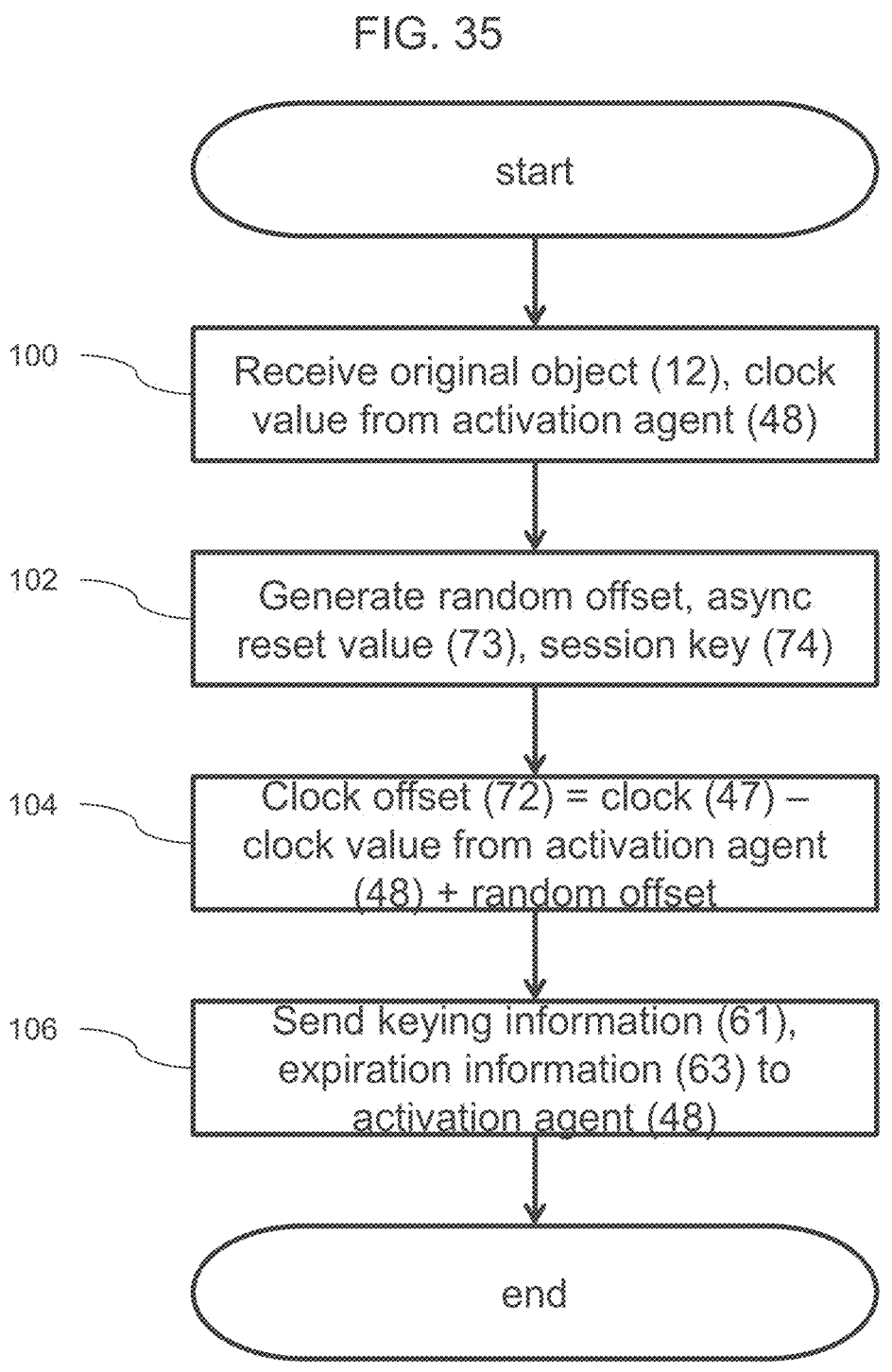
FIG. 35 is a flowchart which shows an embodiment of a method according to the present disclosure, an activation service.

FIG. 35 is a flowchart of object activation service 50 processing according to the present disclosure. The object activation service 50 may be operated for the purpose of providing keying and time synchronization services to an activation agent 48 such that an associated SOI network client 69 or the SOI insertion device 70 can generate statistical objects 14.

The method includes a first flowchart first step 100, wherein the activation service 50 receives at least one original object 12 and the clock 47 value from the activation agent 48. Processing proceeds to the first flowchart second step 102.

In the first flowchart second step 102, the activation service 50 generates a random offset value, an async reset value 73, and a session key 74. Processing proceeds to the first flowchart third step 104.

In the first flowchart third step 104, the activation service 50 computes the clock offset 72 by subtracting the clock 47 value received from the activation agent 48 from the clock 47 value of the activation service 50 and adding the random offset generated in the first flowchart second step 102. The keying information 61 is composed of the session key 74, the clock offset 72, and the async reset value 73. The Processing proceeds to the first flowchart fourth step 106.

In the first flowchart fourth step 106, the activation service 50 communicates the keying information 61 and the expiration information 63 to the activation agent 48. Processing terminates.

VIII. System Operation

The SOI systems presented here operate on the principle that original objects 12S that are known to both an SOI network client 69 or an SOI insertion device 70 and an integrated SOI policy service 40 or an SOI resolution service 46. All other information, including the source address of an SOI network client 69 or a network client 66, the state of synchronization of a clock 47 within an SOI network client 69 or an SOI insertion device 70 and knowledge of secure, shared keying material are presumed to be unknown. Furthermore, it is expected that all services contained within integrated SOI systems 51. integrated SOI policy systems 53 and integrated SOI service 55 are protected against discovery, attack and compromise and thus require a secure, measured approach to obtaining this unknown information which is required for proper SOI operation. Operating an SOI system has up to three phases for each original object. These three phases of operation are bootstrap keying, object activation and statistical object identification.

The objective of the first phase of operation, bootstrap keying, is to provide a set of statistical objects 14S to an SOI network client 69 or an SOI insertion device 70 to enable the authenticated accessing of the object activation service 50. During the bootstrap keying phase, a bootstrap keying agent 45 communicates with a bootstrap keying service 44. During this communication, the bootstrap keying agent 45 sends an original object 12S to the bootstrap keying service 44. The bootstrap keying service 44 responds by sending a set of statistical objects 14S to the bootstrap keying agent 45 to use in the object activation phase. The communication between the bootstrap keying agent 45 and the bootstrap keying service 44 should be secure and private, so that an eavesdropper cannot obtain the statistical objects 14S. In an example embodiment, the Internet Engineering Task Force (IETF) protocol Internet Key Exchange version 2 (IKEv2) is used to provide bootstrap keying.

Once bootstrap keying has been completed, operation moves to the second phase, object activation. The objective of the object activation phase is to provide an SOI network client 69 or an SOI insertion device 70 with the needed information to generate statistical objects 14S from original object 12S such that the statistical objects 14S will be resolved by an integrated SOI system 51 or an SOI resolution service 46. During the object activation phase, an object activation agent 48 communicates with an object activation service 50. During this communication, the object activation agent 48 sends one or more original objects 12S, metadata associated with the original objects 12S and the time value from a clock 47 local to the SOI network client 69 or SOI insertion device 70 to the object activation service 50. The time value is usually expressed as a number of seconds since a reference event, for example time in the Unix operating system is calculated from on Jan. 1, 1970.

The clocks 47 of the integrated SOI system 51, of the integrated SOI services 55, and of the integrated SOI policy system 53 are synchronized with one another. There is no assumption that the clock 47 of the SOI network client 69 or the SOI insertion device 70 is synchronized with the synchronized clocks 47 of the integrated SOI services 55, the integrated SOI policy system 53, or the integrated SOI system 51.

The object activation service 50 responds 44 sending a set of keying information 61 and expiration criterion 63 to the object activation agent 48. The keying information 61 provided to the object activation agent 48 includes a session key 74, a clock offset 72, and an async reset value 73. The clock offset 72 is calculated as the difference between the clock 47 used by the object activation service 50 and the clock value received from activation agent 48 plus a random value generated by the object activation service 50. The async reset value 73 is a random value generated by the object activation service 50. All of the keying information is stored by the object activation service 50 until the activation expires.

Using a unique clock offset 72, a unique async reset value 73, and a unique session key 74 for each original object 12 provides improved protection against attacks based on weaknesses discovered in the hashing algorithm used to generate the statistical objects 14. Previous systems generating statistical objects 14 used a common clock that was synchronized to all participants, including clock 47 of the SOI network client 69 or the SOI insertion device 70, and the synchronized clocks 47 of the integrated SOI services 55, the integrated SOI policy system 53, or the integrated SOI system 51. The clock 47 value was used directly in the generation of the statistical object using a hash function. If an attacker were to discover a weakness in the hash function, the use of a known plaintext, the clock value, and a constant session key used in multiple statistical object generation processes, could enable a mechanism to predict future statistical object from a given session key 74. In an alternative embodiment, with each original object having a unique clock offset 72 and a unique async reset value 73, the use of a session key 74 in the generation of the statistical object 14 is optional. When all components used as inputs to the statistical object generation process are unique and unknown to an attacker, compromises to the system are more difficult.

This provides synchronization between the clock 47 that is local to the SOI network client 69 or SOI insertion device 70 and the clock 47 that is local to the integrated SOI system 51 or the SOI resolution service 46. This is important because many clocks in networking and computing devices lack the ability to maintain high degrees of accuracy over long periods of time. In the present disclosure, the clocks are synchronized during the object activation phase and only remain in synchronization until the provided expiration criterion is met. In an example embodiment, the expiration criterion should be met before the clocks lose synchronization due to clock drift. The clock offset 72 is used as an input to the hashing algorithm that is used to generate statistical object 14S.

The keying information 61 provided to the object activation agent 48 also includes a session key 74. This session key 74 is used as an input to the hashing algorithm that is used to generate statistical objects 14S. The use of session keys 74 eliminates the need to securely store keys persistently. When an SOI network client 69 or an SOI insertion device 70 is powered off, or if the link fails connecting to the network 64, then the session key 74 is discarded and the SOI network client 69 or SOI insertion device 70 performs object activation again to obtain a new session key 74.

The keying information 61 provided to the object activation agent 48 also includes an asynchronous reset value 73. This asynchronous reset value 73 is used as an input to the hashing algorithm that is used to generate statistical objects 14S. The use of an asynchronous reset value 73 eliminates the need for a high frequency clock. Higher frequency clocks can be more difficult to synchronize. Using an asynchronous counter with a reset value enables statistical objects 14S to be generated at a rate greater than the clock frequency while still maintaining unique statistical objects 14S. On each tick of the clock 47, the asynchronous counter is set to the asynchronous reset value 73. Whenever a statistical object is generated, the asynchronous counter is incremented. In this way, the combination of the synchronized clock and the asynchronous counter will always result in a unique value.

When the object activation agent 48 communicates original objects 12S to the object activation service 50, the object activation agent 48 may also communicate metadata associated with the original object 12S. This metadata may be geophysical information, biometric information, application metadata or any other metadata that an object activation service 50 may use in its activation process. The object activation service 50 may be presented with more than one original object 12S from the object activation agent 48. The keying information 61 associated with the original object 12S is provided at the discretion of the object activation service 50. The object activation service 50 may provide keying information 61 for only a subset of the original objects 12S or the object activation service 50 may not provide keying information 61 for any of the original objects 12S. The object activation service 50 may have policies or rules that govern what original objects 12S or original objects 12S and their associated metadata will be given keying information 61. These policies or rules can be as simple as "IF the original object is Ben, THEN provide keying information" or they can be more complex such as "IF the original object is Ben and the associated metadata indicates that Ben is in California THEN provide keying information" or "IF the original object is Ben and the associated metadata indicates that the requesting application is Email THEN provide keying information". A single original object 12S with multiple metadata associations may be given multiple sets of keying information 61 corresponding to the different metadata associations.

The communication between the object activation agent 48 and the object activation service 50 should be secure and private, so that an eavesdropper cannot obtain the keying information 61. In an example embodiment, the communications are secured by using Transport Access Control, which uses a statistical object 14S to establish a TCP session between the object activation agent 48 and the object activation service 50. Once the TCP session has been established, a TLS session is established to provide privacy for the information. In an example embodiment, the original object 12S provided during TLS session establishment should be the same original object that was provided during the bootstrap keying phase.

Once object activation has been completed, operation moves to the third phase, statistical object identification. As this point, an SOI network client 69 or an SOI insertion device 70 has the information needed to generate statistical objects 14S and an integrated SOI system 51 or an SOI resolution service 46 has the same information, enabling them to resolve received statistical objects 14S generated by an SOI network client 69 or an SOI insertion device 70 to the original objects 12S.

An SOI system has two primary components, an SOI insertion policy service 42 and an SOI policy service 40. Both of these services can reside in a single device. The SOI insertion policy service 42 is responsible for generating statistical objects 14S from an original object 12S and inserting the statistical object 14S into a message 68. The SOI policy service 40 is responsible for receiving the message 68, extracting the statistical object 14S and using a local SOI resolution service 46, performing statistical object identification to determine the original object 12S.

The SOI resolution service 46 operates as device 10. When a statistical object 14S is successfully resolved to an original object 12S and the probability threshold value 27 has been met, the original object 12S is communicated to the SOI policy service 40 where the original object 12S used as a key to locate policy information 60 in a policy table 59. The policy information 60 describes what to do with the message 68. Common policies include forwarding the message 68 to its intended destination, discarding the message 68, or rewriting the message 68 or its corresponding communications characteristics 22. In an example embodiment, when the SOI resolution service 46 cannot find a matching statistical object 14M that matches the statistical object 14S associated with the message 68, then the original object 12S associated with the message 68 is a special original object called "the unknown object". The unknown object is communicated to the SOI policy service 40 where it is used as a key to locate policy information 60 in a policy table 59. The policy information 60 describes what to do with the message 68.

In an example embodiment, when the SOI resolution service 46 cannot find a matching statistical object 14M that matches the statistical object 14S associated with the message 68, the SOI resolution service 46 sends the message 68 and the associated statistical object 14S to a second SOI resolution service 49. The entire message 68 is sent so that the SOI resolution service 46 can operate statelessly with respect to the message 68. The second SOI resolution service 49 operates as device 10. The second SOI resolution service 49 receives the message 68 and the associated statistical object 14S and performs statistical object identification. When a statistical object 14S is successfully resolved to an original object 12S and the probability threshold value 27 has been met, the original object 12S, the associated message 68, keying information 61, policy information 60 and expiration criterion are all communicated to the SOI resolution service 46. The SOI resolution service 46 received the information and generates statistical objects 14S until the expiration criterion 63 is met. The original object 12S, the message 68 and policy information 60 is communicated to the SOI policy service 40 where the policy information 60 is placed in the policy table 59. The message 68 is processed in accordance with the policy information 60. Subsequent messages 68 with statistical objects 14S generated from the same original object 12S will be processed solely by the SOI resolution service 46 until the expiration criterion 63 is met and this process does not require the assistance of the second SOI resolution service 49. In this way, a local instance of an SOI resolution service 46 can learn original objects 12S and their associated keying information 61, their associated policy information 60 and their expiration criterion 63. This process can also be extended with additional levels of SOI resolution services 46.

An SOI insertion policy service 42 is used by an SOI network client 69 and an SOI insertion device 70. In an SOI network client 69, the SOI policy insertion service 42 operates on the same device as the computer application 65. An SOI network client 69 generally presents a single original object 12S during object activation, but may present multiple associated metadata relationships, which may result in multiple sets of keying information 61. The SOI policy insertion service 42 in an SOI network client 69 only performs object activation and statistical object identification for itself and does not generate statistical objects on behalf of network clients 66. In an SOI insertion device 70, the policy insertion service 42 operates on a separate device, logical or physical, as the computer application 65. The SOI policy insertion service 42 in an SOI insertion device 70 performs object activation and SOI on behalf of other network clients 66.

The object activation agent 45 of an SOI network client 69 may communicate metadata in addition to communicating an original object 12S to the object activation service 50. In response, the object activation service 50 communicates sets of keying information 61 and expiration criterion 63 to the object activation agent 45. Subsequently, when the computer application 65 in an SOI network client 69 attempts to communicate with a network resource 62 by sending a message 68, the SOI insertion policy service 42 intercepts the message 68, generates a statistical object 14S based on the keying information 61 provided to the object activation agent 45 and inserts the statistical object 14S into the message 68. The message 68 is then forwarded to the network resource 62. If the object activation agent 45 sent metadata to the object activation service 50, the SOI insertion policy service 42 selects the appropriate keying information 61 when generating the statistical object 14S. For example, if the object activation agent 45 uses a certificate showing the Identity of "Ben" as the original object 12S and also sends a list of application signatures as metadata components associated with the original object 12S to the object activation service 50 as follows:

| Index | Application | Signature |
|-------|-------------|-----------|
| 1 | email | application signature 1 |
| 2 | safari | application signature 2 |
| 3 | facebook | application signature 3 |

The object activation service 50 may return a set of keying information 61, with each element of the set being associated with different metadata components as follows:

| Index | Keying Information |
|-------|-------------------|
| 1 | keying information 1 |
| 2 | keying information 2 |
| 3 | no keying information |

With this keying information 61, and the computer application 65 being "safari", when a message 68 is received by the SOI policy insertion service 42, the SOI policy insertion service 42 will determine that the computer application 65 that sent the message 68 was "safari" and will then generate a statistical object 14S based on the keying information 61 "keying information 2". This enables an integrated SOI system 51 or an integrated SOI policy system 53 to determine that the message 68 was sent by "Ben" using the application "safari".

When an SOI insertion device 70 is used in place of an SOI network client 69, the SOI insertion device 70 should be able to associate communications characteristics 22 with an original object 12S before being able to generate a statistical object 14S. When a network client 66 sends a message 68 to a network resource 62, it is received by an SOI insertion device 70. The communications characteristics 22 associated with the received message 68 are compared to entries in an insertion object table 57 by the SOI policy insertion service 42. If a matching entry is found, the corresponding keying information 61 is used by the SOI policy insertion service 42 to generate a statistical object 14S and the statistical object 14S is inserted into the message 68 which is forwarded to the network resource 62. The provisioning of entries of communications characteristics 22 and associated keying information 61 in the insertion object table 57 can be accomplished manually or statically or can be automated and self-learning. In an example embodiment, when a message 68 with associated communications characteristics 22 is received by an SOI policy insertion service 42 and the communications characteristics 22 do not match any entries in the insertion object table 57, the SOI policy insertion service 42 can query an external service, using the communications characteristics 22 as the query key. The external service may return an original object 12S associated with the communications characteristics 22. For example, for networks using IEEE 802.1x port authentication, the source MAC address may be used as the query key and the external service would return the authenticated identity associated with the source MAC address. Once the SOI policy insertion service 42 has received an original object 12S from the external service, an object activation agent 48 will communicate the original object 12S to an object activation service 50, which may return keying information 61 and expiration criterion 63 back to the object activation agent 48. This information is added to the insertion object table 57. Periodically, the insertion object table 57 maybe checked to determine if any of the expiration criterion 63 has been satisfied and if so, the entry corresponding to the satisfied expiration criterion is removed from the insertion object table 57.

LIST OF REFERENCE CHARACTERS IN THE DRAWINGS

| | |
|---|---|
| 10 | Device (Remote System) |
| 12M | Matched Original Object |
| 12P | Plurality of Original Objects |
| 12S | Original Object |
| 12SEL | Selected Original Object |
| 13 | Attack Measurement |
| 13A | Accumulated Attack Measurement |
| 13P | Plurality of Attack Measurements |
| 14A | Accumulated Statistical Object |
| 14AP | Plurality of Accumulated Statistical Objects |
| 14F | First Statistical Object |
| 14M | Matching Statistical Object |
| 14MA | Matching Accumulated Statistical Object |
| 14MP | Plurality of Matching Statistical Objects |
| 14NA | New Accumulated Statistical Object |
| 14P | Plurality of Statistical Objects |
| 14S | Statistical Object |
| 15 | Timestamp |
| 16 | Communications Receiver |
| 18 | Statistical Object Matcher |
| 20 | Accumulated Statistical Object Selector |
| 22 | Communications Characteristics |
| 24 | Associated Original Object Selector |
| 26 | Original Object Identifier |
| 27 | Probability Threshold Value |
| 28 | Associated Original Object Identifier |
| 30 | Probability Calculator |
| 32 | Threshold Comparator |
| 34 | Indication |
| 36 | Calculated Probability |
| 38 | Time Period |

(All logical components from 12M to 38 may be included in device 10).

| | |
|---|---|
| 40 | SOI Policy Service |
| 42 | SOI Insertion Policy Service |
| 44 | Bootstrap Keying Service |
| 45 | Bootstrap Keying Agent |
| 46 | SOI Resolution Service |
| 47 | Clock |
| 48 | Object Activation Agent |
| 49 | Second SOI Resolution Service |
| 50 | Object Activation Service |
| 51 | Integrated SOI System |
| 52 | Identity Management System |
| 53 | Integrated SOI Policy System |
| 55 | Integrated SOI Services |
| 56 | Dynamic Blacklisting Table |
| 57 | Insertion Object Table |
| 59 | Policy Table |
| 60 | Policy Information |
| 61 | Keying information |
| 62 | Network Resource |
| 63 | Expiration Criterion |
| 64 | Computer Network |
| 65 | Computer Application |
| 66 | Network Client |
| 67 | Network Interface |
| 68 | Message |
| 69 | SOI Network Client |
| 70 | SOI Insertion Device |
| 72 | Clock Offset |
| 73 | Async Reset Value |
| 74 | Session Key |
| 100 | First Flowchart First Step |
| 102 | First Flowchart Second Step |
| 104 | First Flowchart Third Step |
| 106 | First Flowchart Fourth Step |

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method, comprising:

operating an activation agent to access a clock value and at least one original object;

communicating said clock value and said at least one original object to an object activation service; and operating said object activation service to generate keying information and at least one expiration criterion for said at least one original object, wherein said keying information comprises a clock offset and an async reset value, wherein said object activation service communicates said keying information and said at least one expiration criterion to said activation agent, wherein said clock offset include es a random value, and wherein said async reset value include es a random value.

2. The method of claim 1, further comprising generating unique keying information for each of a plurality of original objects.

3. The method of claim 1, wherein said keying information comprises a session key.

4. The method of claim 2, further comprising:

using said object activation agent, communicating said keying information, and said at least one expiration criterion for each of the plurality of original objects to a statistical object identification (SOI) insertion policy service;

communicating from a network client a message to a network resource, said message being communicated via said SOI insertion policy service;

using said SOI insertion policy service, selecting at least one of said plurality of original objects, and generating a statistical object using said keying information associated with said selected at least one of said plurality of original objects;

using said SOI insertion policy service to insert said statistical object into said message; and forwarding said message to said network resource.

5. The method of claim 4, wherein each of said statistical objects is uniquely generated at a frequency greater than a frequency of said clock.

6. The method of claim 1, further comprising:

operating said activation agent to access said clock value and a plurality of original objects, and to communicate said clock value and said plurality of original objects to said object activation service;

operating said object activation service to generate keying information and at least one expiration criterion for each of said plurality of original objects;

operating said object activation service to communicate said keying information and said at least one expiration criterion for each of said plurality of original objects to a statistical object identification (SOI) insertion policy service; and operating a SOI policy service to generate, for each of said plurality of original objects, at least one statistical object using said keying information.

7. The method of claim 6, further comprising:

ceasing operating said SOI policy service from generating statistical objects after said at least one expiration criterion has been met.

8. The method of claim 1, further comprising:

operating said object activation agent to communicate said keying information, and said at least one expiration criterion for each of a plurality of original objects to a statistical object identification (SOI) resolution service; and operating said SOI resolution service to generate a plurality of statistical objects using said keying information for each of the plurality of original objects (12P).

9. The method of claim 8, further comprising:

ceasing operating said SOI resolution service from generating statistical objects after said at least one expiration criterion has been met.

10. A method comprising:

operating a first statistical object identification (SOI) resolution service to receive a plurality of original objects, keying information (61), an expiration criterion, and policy information from a second statistical object identification (SOI) resolution service, said keying information comprising a clock offset, and an async reset value, wherein said clock offset include es a random value, and wherein said async reset value include es a random value; and operating said second SOI resolution service to generate a plurality of statistical objects, wherein each of the plurality of statistical objects correspond s to one of said plurality of original objects, wherein said generating continues until said expiration criterion is satisfied.

11. The method of claim 10, wherein said keying information comprises a session key.

\* \* \* \* \*